(12) United States Patent
Abbaszadeh et al.

(10) Patent No.: US 11,487,598 B2
(45) Date of Patent: Nov. 1, 2022

(54) ADAPTIVE, SELF-TUNING VIRTUAL SENSING SYSTEM FOR CYBER-ATTACK NEUTRALIZATION

(71) Applicant: GENERAL ELECTRIC COMPANY, Schenectady, NY (US)

(72) Inventors: Masoud Abbaszadeh, Clifton Park, NY (US); Mustafa Tekin Dokucu, Latham, NY (US); Justin Varkey John, Schenectady, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 521 days.

(21) Appl. No.: 16/574,493

(22) Filed: Sep. 18, 2019

(65) Prior Publication Data
US 2021/0081270 A1 Mar. 18, 2021

(51) Int. Cl.
G06F 11/00 (2006.01)
G06F 11/07 (2006.01)
(Continued)

(52) U.S. Cl.
CPC .......... *G06F 11/0736* (2013.01); *G06F 17/18* (2013.01); *G06K 9/6297* (2013.01); *G06N 20/00* (2019.01); *H04L 63/1416* (2013.01)

(58) Field of Classification Search
CPC ........ G06F 11/0736; G06K 9/62; G06K 9/97; G06N 20/00; G06N 20/10; G06N 3/08;
(Continued)

(56) References Cited

U.S. PATENT DOCUMENTS 7,051,246 B2 * 5/2006 Benesty ................ H04J 3/0664
714/25
8,407,791 B2 3/2013 Granstedt et al.
(Continued)

FOREIGN PATENT DOCUMENTS

WO 2017171639 A1 10/2017

OTHER PUBLICATIONS

Xu, "Adaptive Intrusion Detection Based on Machine Learning: Feature Extraction, Classifier Construction and Sequential Pattern Prediction", International Journal of Web Services Practices, vol. 2, Issue: 1-2, pp. 49-58, 2006.
(Continued)

*Primary Examiner* — Sarai E Butler
(74) *Attorney, Agent, or Firm* — Buckley, Maschoff & Talwalkar LLC

(57) ABSTRACT

An industrial asset may have a plurality of monitoring nodes, each monitoring node generating a series of monitoring node values over time representing current operation of the industrial asset. An abnormality detection computer may determine that an abnormal monitoring node is currently being attacked or experiencing a fault. An autonomous, resilient estimator may continuously execute an adaptive learning process to create or update virtual sensor models for that monitoring node. Responsive to an indication that a monitoring node is currently being attacked or experiencing a fault, a level of neutralization may be automatically determined. The autonomous, resilient estimator may then be dynamically reconfigured to estimate a series of virtual node values based on information from normal monitoring nodes, appropriate virtual sensor models, and the determined level of neutralization. The series of monitoring node values from the abnormal monitoring node or nodes may then be replaced with the virtual node values.

21 Claims, 28 Drawing Sheets

(51) Int. Cl.
  *H04L 9/40* (2022.01)
  *G06F 17/18* (2006.01)
  *G06K 9/62* (2022.01)
  *G06N 20/00* (2019.01)
(58) Field of Classification Search
  CPC . H04L 63/1416; H04L 63/1425; H04L 9/002; H04L 67/12; Y02P 90/02; Y04S 40/18; Y04S 40/20; G05B 2219/131356; G05B 19/4185
  USPC .......................................................... 714/1–57
  See application file for complete search history.

(56) References Cited

U.S. PATENT DOCUMENTS

| | | | |
|---|---|---|---|
| 10,204,226 B2 | 2/2019 | Bushey et al. | |
| 10,218,729 B2 | 2/2019 | Gay et al. | |
| 10,234,853 B2 | 3/2019 | Mukkamala et al. | |
| 2005/0262394 A1* | 11/2005 | Yasukawa | G06F 11/0748 714/E11.026 |
| 2011/0084871 A1* | 4/2011 | Haykin | G01S 7/4008 342/90 |
| 2011/0115453 A1* | 5/2011 | Marsili | H02M 3/1582 323/234 |
| 2013/0117608 A1* | 5/2013 | Kirby | G01W 1/10 714/E11.02 |
| 2013/0211871 A1* | 8/2013 | Ghosh | G06Q 10/06 705/7.28 |
| 2016/0154710 A1* | 6/2016 | Wade | G06F 11/36 714/19 |
| 2018/0137277 A1 | 5/2018 | Mestha et al. | |
| 2018/0191758 A1* | 7/2018 | Abbaszadeh | H04L 63/1425 |
| 2018/0255091 A1* | 9/2018 | Mestha | H04L 63/1416 |
| 2019/0068618 A1 | 2/2019 | Mestha et al. | |
| 2019/0230106 A1* | 7/2019 | Abbaszadeh | H04L 63/1441 |
| 2020/0104184 A1* | 4/2020 | Subramanian | G06N 3/08 |

OTHER PUBLICATIONS

M. Komar et al., "High Performance Adaptive System For Cyber Attacks Detection", 2017 9th IEEE International Conference on Intelligent Data Acquisition and Advanced Computing Systems: Technology and Applications (IDAACS), pp. 853-858, Bucharest, Romania, 2017.

* cited by examiner

| VIRTUAL SENSOR MATRIX 910 | SIGNAL BEING ESTIMATED 920 |
|---|---|
| $C_{1,1}$ | DWATT |
| $C_{2,1}$ | TTXM |
| $C_{3,1}$ | CTD |
| $C_{4,1}$ | FQG |
| $C_{5,1}$ | CPD |
| $C_{6,1}$ | CTIM |
| $C_{1,2}$ | DWATT, TTXM |
| .... | .... |
| $C_{ts,2}$ | CPD, CTD |

VIRTUAL SENSOR LOOKUP TABLE — 900

*FIG. 9*

| EFFECT / ATTACK | CPD | CTD | CTIM | FQG | DWATT | TTXM |
|---|---|---|---|---|---|---|
| CPD | 1 | 1 | 0 | 0 | 1 | 1 |
| CTD | 1 | 1 | 0 | 0 | 1 | 1 |
| CTIM | 0 | 0 | 1 | 0 | 0 | 0 |
| FQG | 0 | 0 | 0 | 1 | 1 | 1 |
| DWATT | 1 | 1 | 0 | 0 | 1 | 0 |
| TTXM | 1 | 1 | 1 | 0 | 0 | 1 |

*FIG. 20*

| INDUSTRIAL ASSET IDENTIFIER 2402 | INDUSTRIAL ASSET DESCRIPTION 2404 | VIRTUAL SENSOR IDENTIFIER 2406 | MATRIX 2408 | DESCRIPTION 2410 | STATUS 2412 | NEUTRALIZATION LEVEL 2414 |
|---|---|---|---|---|---|---|
| IA_2001 | GAS TURBINE | VS_01 | C1,1 | DWATT | NORMAL | |
| IA_2001 | GAS TURBINE | VS_02 | C2,1 | TTXM | ATTACKED | SAFE SHUT DOWN |
| IA_2001 | GAS TURBINE | VS_03 | C5,1 | CPD | PREDICTED | DEGRADED |
| IA_2002 | ELECTRIC POWER GRID | VS_04 | C1,2 | WIND TURBINE | NORMAL | |

*FIG. 24*

ADAPTIVE, SELF-TUNING VIRTUAL SENSING SYSTEM FOR CYBER-ATTACK NEUTRALIZATION

This invention was made with Government support under contract number DE-OE0000903 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

It may be important to maintain an industrial asset's functionality during an attack. For example, an operator may want a power generation plant to continue to provide electricity even when one or more sensors, actuators, etc. are the subject of a cyber-attack. It may similarly be desired to operate the asset when one or more monitoring nodes fail. Moreover, it may be advantageous to provide protection for an industrial asset without requiring redundant components (e.g., industrial control systems) and/or any major changes and/or re-design of controllers.

SUMMARY

According to some embodiments, an industrial asset may be associated with a plurality of monitoring nodes, each monitoring node generating a series of monitoring node values over time that represent operation of the industrial asset. An abnormality detection computer may determine that at least one abnormal monitoring node is currently being attacked or experiencing a fault. An autonomous, resilient estimator may continuously execute an adaptive learning process to create or update virtual sensor models for the monitoring nodes. Responsive to an indication that a monitoring node is currently being attacked or experiencing a fault, a level of neutralization may be automatically determined. The autonomous, resilient estimator may then be dynamically reconfigured to estimate a series of virtual node values for the abnormal monitoring node or nodes based on information from normal monitoring nodes, appropriate virtual sensor models, and the determined level of threat neutralization. The series of monitoring node values from the abnormal monitoring node or nodes may then be replaced with the virtual node values.

Some embodiments comprise: means for determining, by an abnormality detection computer, that at least one abnormal monitoring node is currently being attacked or experiencing a fault; means for continuously executing, by an autonomous, resilient estimator, an adaptive learning process to create or update virtual sensor models for the monitoring nodes; responsive to an indication that at least one abnormal monitoring node is currently being attacked or experiencing a fault, means for automatically determining a level of threat neutralization; means for dynamically reconfiguring the autonomous, resilient estimator to estimate a series of virtual node values for the abnormal monitoring node or nodes based on information from normal monitoring nodes, appropriate virtual sensor models, and the determined level of neutralization; and means for replacing the series of monitoring node values from the abnormal monitoring node or nodes with the virtual node values.

Some technical advantages of some embodiments disclosed herein are improved systems and methods to protect an industrial asset from cyber-attacks in an automatic and accurate manner.

BRIEF DESCRIPTION OF THE DRAWINGS

FIG. 9 includes a portion of a virtual sensor lookup table according to some embodiments.

FIG. 20 is a causal dependency matrix of monitoring nodes in accordance with some embodiments.

FIG. 24 is a tabular portion of a virtual sensor database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
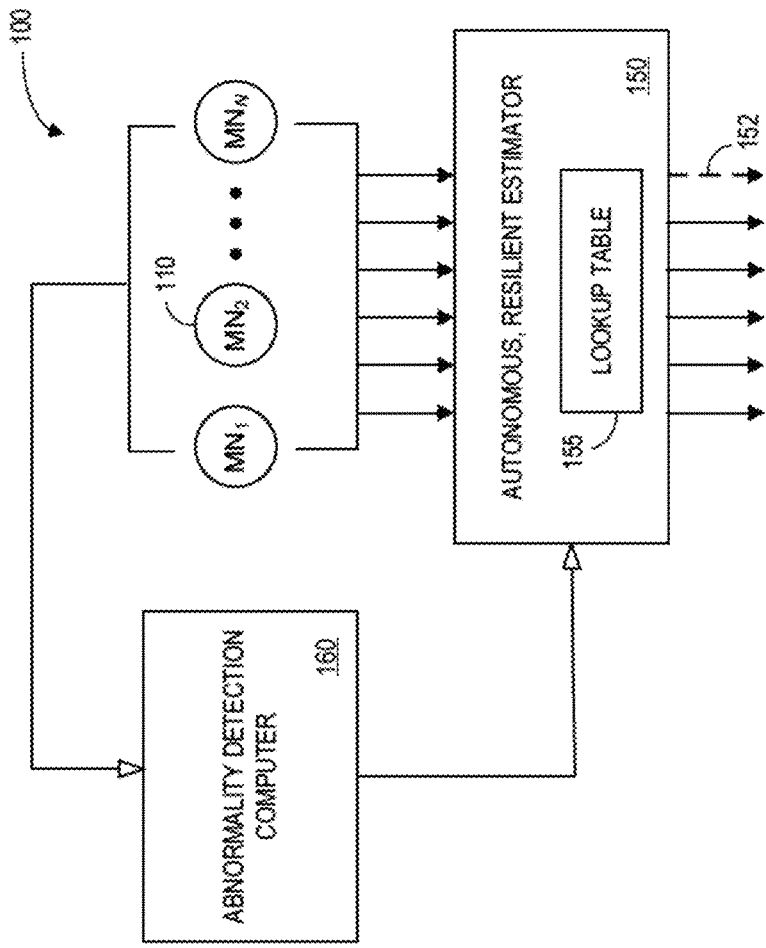
FIG. 1 is a high-level block diagram of a system to protect an industrial asset according to some embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. In particular, an operator of an industrial asset might want to implement "accommodation" procedures such that critical functions of the asset may automatically still function even in the event of one or more cyber-attacks or monitoring node failure (e.g., by replacing unhealthy sensor node data values with virtual sensor data values based on information obtained from other, healthy nodes). FIG. 1 is a high-level architecture of a system 100 that might be used to protect an industrial asset such as a gas turbine. The system 100 may include a plurality of monitoring nodes 110, each monitoring node generating a series of monitoring node values over time that represent operation of the industrial asset (e.g., a temperature, a speed, a voltage, etc.). An abnormality detection computer 160 coupled to the monitoring nodes 110 may be adapted to determine that a particular monitoring node is currently being attacked by a cyber-threat or is experiencing a failure (e.g., a sensor might be stuck). An autonomous, resilient estimator 150 may receive an indication of the abnormal monitoring node and, as a result, estimate a series of virtual node values for the attacked monitoring node based on information received from monitoring nodes that are not currently being attacked (e.g., using a lookup table 155). In some embodiments, an estimation of series of virtual node values happens in real-time during normal operation as opposed to estimating the virtual node values after the abnormal monitoring node information is received. Soon after the abnormal monitoring node information is received, signals from abnormal monitoring nodes are replaced by the most current virtual node values. The virtual sensor may then replace the series of monitoring node values from the attacked monitoring node with the virtual node values (e.g., as illustrated by the dashed arrow output 152 in FIG. 1).

Figure 2:
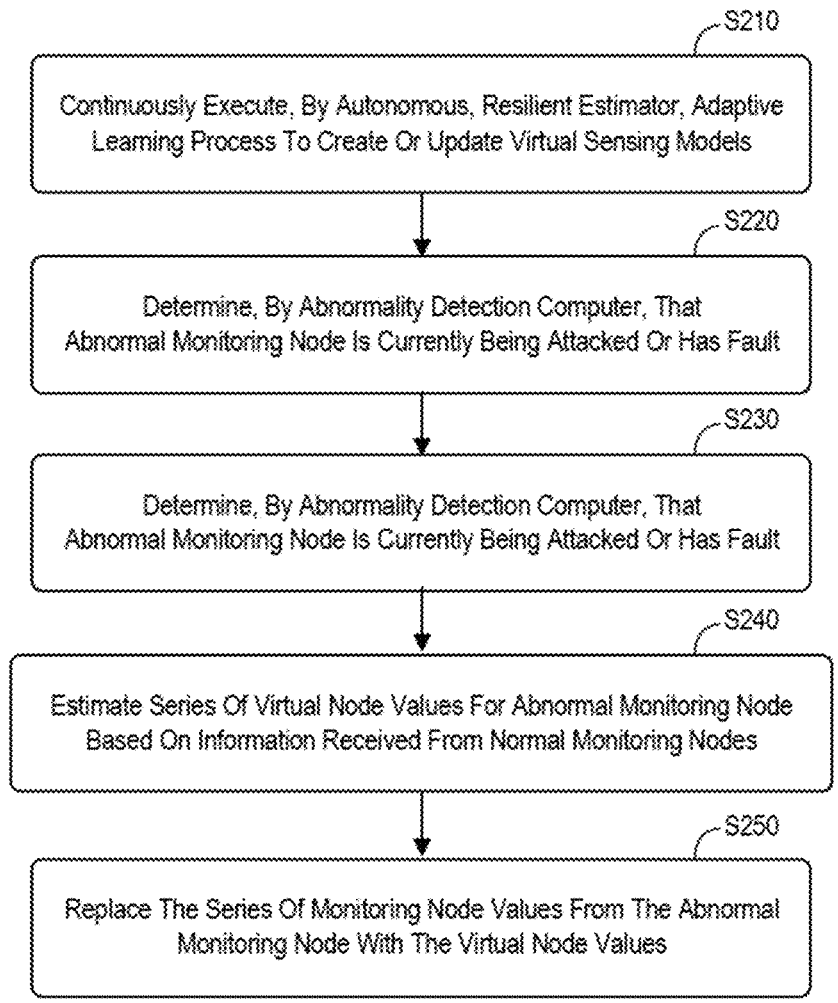
FIG. 2 is an industrial asset protection method in accordance with some embodiments.

FIG. 2 is an industrial asset protection method that might be associated with the elements of the system of FIG. 1. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, they system may continuously execute (e.g., on-line as the industrial asset operates) an adaptive learning process to create (when no pre-determined model is available) or update (when a pre-determined model was created off-line) virtual sensing models in accordance with any of the embodiments described herein. The adaptive learning process might be associated with, for example, a reinforcement learning method.

At S220, an abnormality detection computer might determine that one or more monitoring nodes is currently abnormal (e.g., the node being attacked and/or is experiencing a failure). At S230, an appropriate level of neutralization is determined (e.g., as described in connection with FIG. 27). At S240, an autonomous, resilient estimator may estimate a series of virtual node values for the abnormal monitoring node based on the determined level of neutralization and information received from monitoring nodes that are currently normal. That is, information from "healthy" monitoring nodes may be used to estimate data from a monitoring node that is behaving abnormally. Note that the estimations associated with S240 might be performed even before a determination is made that a particular node is currently being attacked (e.g., at S220). At S250, the series of monitoring node values from the attacked monitoring node may be replaced with the virtual node values: As a result, the industrial asset may continue to operate even when undergoing a cyber-attack or monitoring node failure. According to some embodiments, the series of virtual node values are estimated directly in time space (e.g., after pre-filtering as described herein).

Figure 3:
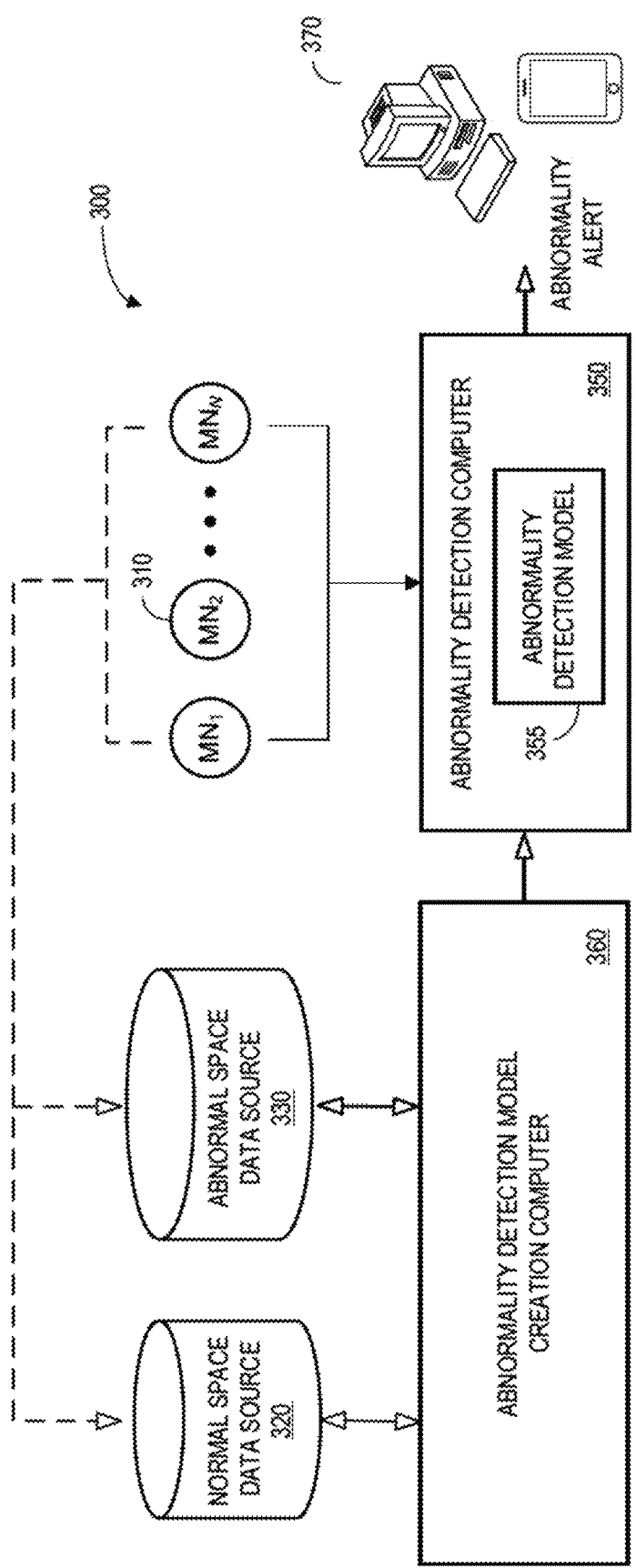
FIG. 3 is a block diagram of an industrial asset protection system according to some embodiment.

Note that a determination that a particular monitoring node is currently abnormal might be based on an abnormality detection model created for the industrial asset. For example, FIG. 3 is an example of an industrial asset protection system 300. The system 300 may include a "normal space" data source 320 storing, for each of a plurality of monitoring nodes 310, a series of normal values over time that represent normal operation of an industrial asset (e.g., collected from actual monitoring node 310 data as illustrated by the dashed line in FIG. 3). The system 300 may also include an "abnormal space" data source 330 storing series of values over time associated with monitoring nodes undergoing a cyber-attack (e.g., as recorded during an actual attack or as predicted by a high-fidelity physics-based industrial asset model) and/or experiencing a failure.

Information from the normal space data source 320 and the abnormal space data source 330 may be provided to an abnormality detection model creation computer 360 that uses this data to create a decision boundary (that is, a boundary that separates normal behavior from abnormal behavior). The decision boundary may then be used by an abnormality detection computer 350 executing an abnormality detection model 355. The abnormality detection model 355 may, for example, monitor streams of data from the monitoring nodes 310 comprising data from sensor nodes, actuator nodes, and/or any other critical monitoring nodes (e.g., monitoring nodes $MN_1$ through $MN_N$) and automatically output an abnormality alert (e.g., indicating that various monitoring nodes of the industrial asset are normal, attacked, or experiencing a fault) to one or more remote monitoring devices 370 when appropriate (e.g., for display to a user) and/or to an autonomous, resilient estimator. As used herein, the terms "automatically" or "autonomous" may refer to, for example, actions that can be performed with little or no human intervention. According to some embodiments, information about a detected abnormality may also be transmitted back to an industrial control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 360 may store information into and/or retrieve information from various data stores, such as the normal space data source 320 and the abnormal space data source 330. The various data sources may be locally stored or reside remote from the abnormality detection model creation computer 360. Although an abnormality threat detection model creation computer 360 is shown in FIG. 3, any number of such devices may be included. Moreover, various devices described herein might be combined according to embodiments of the present invention. For example, in some embodiments, the abnormality detection model creation computer 360, normal space data source 320, and abnormal space data source 330 might comprise a single apparatus. The abnormality detection model creation computer 360 and/or abnormality detection computer 350 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack detection trigger levels or model configurations) and/or provide or receive automatically generated recommendations or results from the abnormality detection model creation computer 360 and/or the abnormality detection computer 350.

Figure 4:
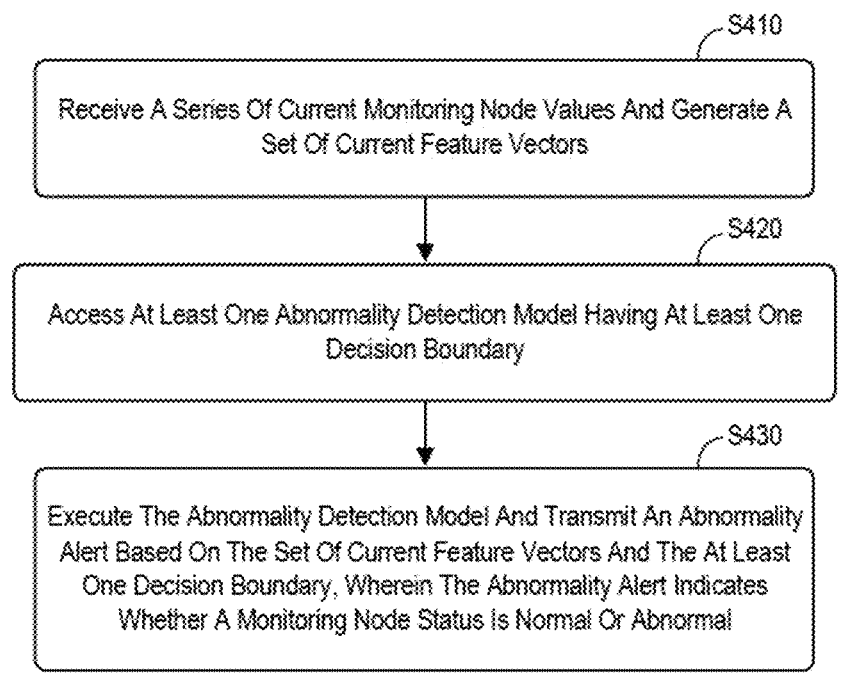
FIG. 4 illustrates a method of generating an abnormality alert in accordance with some embodiments.

The decision boundary associated with the abnormality detection model 355 can be used to detect cyber-attacks. For example, FIG. 4 is an industrial asset protection method that might be implemented according to some embodiments. At S410, the system may receive, from a plurality of monitoring nodes, a series of current values over time that represent a current operation of an industrial asset. The system may also generate, based on the received series of current values, a set of current feature vectors. At S420, an abnormality detection model may be accessed including at least one decision boundary. At S430, the model may be executed and an abnormality alert may be transmitted (e.g., to an autonomous, resilient estimator) based on the set of current feature vectors and the decision boundary when appropriate (e.g., when a cyber-attack or fault is detected). According to some embodiments, one or more response actions may be performed when an abnormality alert is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, a virtual sensor might be created or deployed, etc.

When available, a system may take advantage of the physics of an industrial asset by learning a priori from tuned high fidelity equipment models and/or actual "on the job" data to detect single or multiple simultaneous adversarial threats to or faults in the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 5:
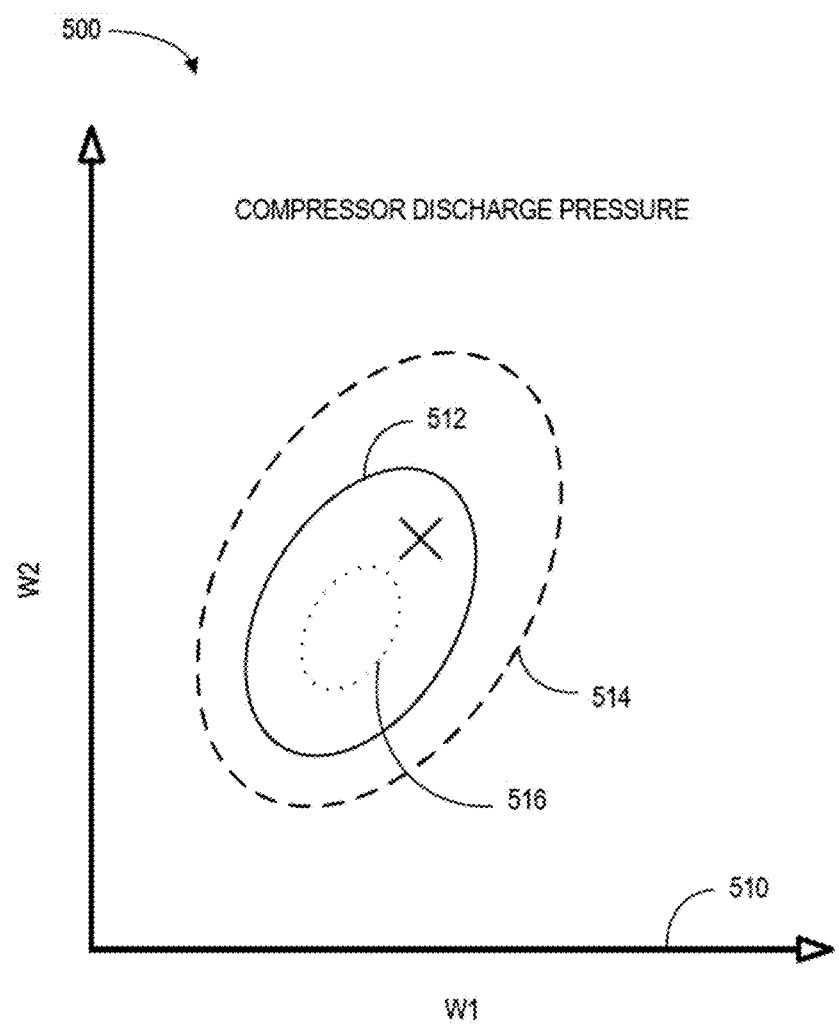
FIGS. 5 and 6 illustrate features, feature vectors, and decision boundaries in accordance with some embodiments.
Figure 6:
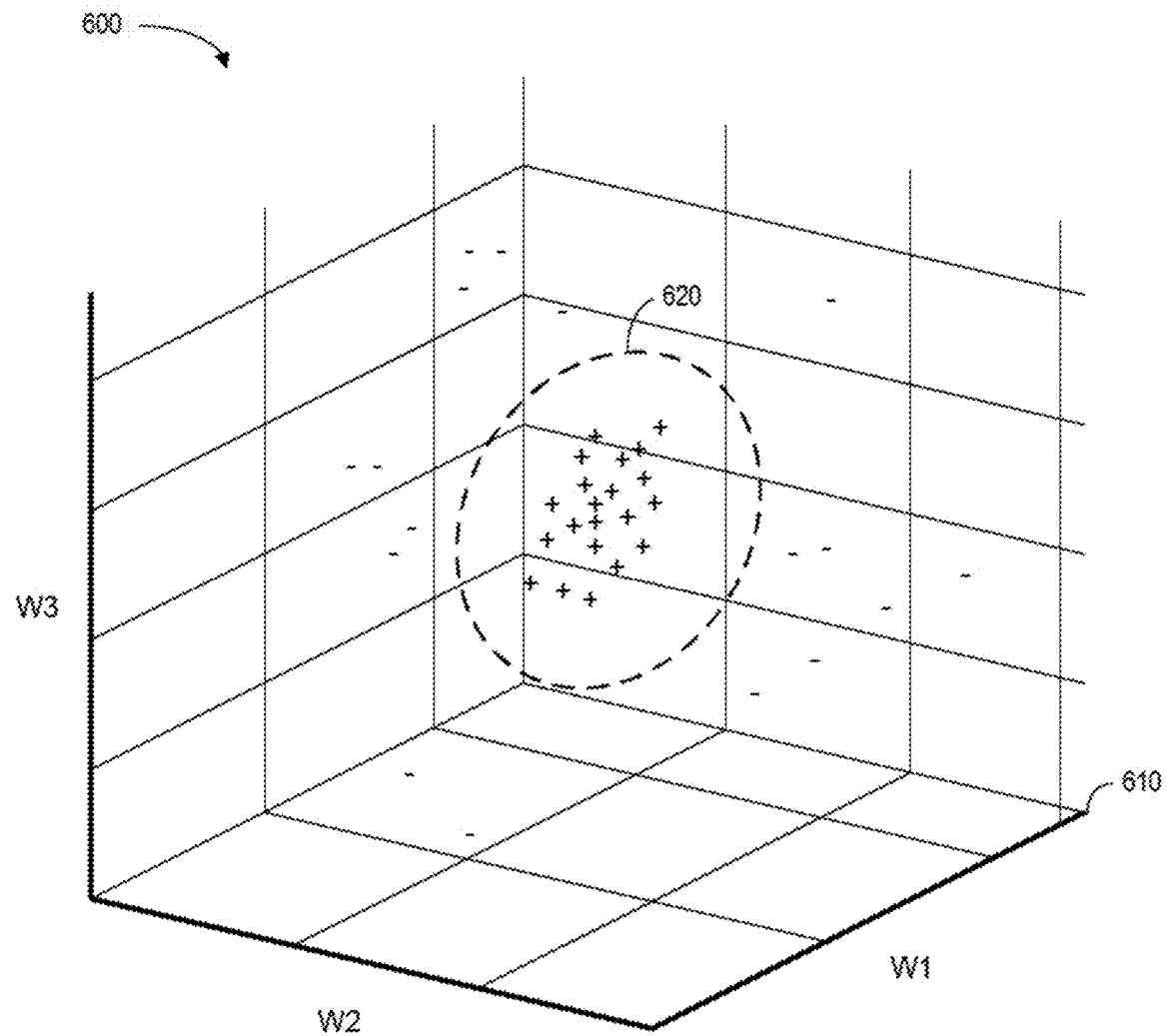

FIGS. 5 and 6 illustrate features, feature vectors, and decision boundaries in accordance with some embodiments. In particular, FIG. 5 illustrates 500 boundaries and feature vectors for a monitoring node parameter in accordance with some embodiments. A graph 510 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 510 illustrated in FIG. 5 represents compressor discharge temperature for a gas turbine but other values might be monitored instead (e.g., compressor pressure ratio, compressor inlet temperature, fuel flow, generator power, gas turbine exhaust temperature, etc.). The graph 510 includes an average boundary 512 (solid line), a minimum boundary 514 (dotted line), a maximum boundary 516 (dashed line), and an indication associated with current feature location for the monitoring node parameter (illustrated with an "X" on the graph 510). As illustrated in FIG. 5, the current monitoring node location is between the minimum and maximum boundaries (that is, the "X" is between the dotted and dashed lines). As a result, the system may determine that the operation of the industrial asset is normal (and no attack or fault is being detected for that monitoring node). FIG. 6 illustrates 600 three dimensions of threat node outputs in accordance with some embodiments. In particular, a graph 610 plots monitoring node outputs during normal operation ("+") and when under attack or experiencing a fault ("−") in three dimensions, such as dimensions associated with PCA: w1, w2, and w3. Moreover, the graph 610 includes a dashed line indication of a normal operating space decision boundary 620.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine learning based supervised learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 7:
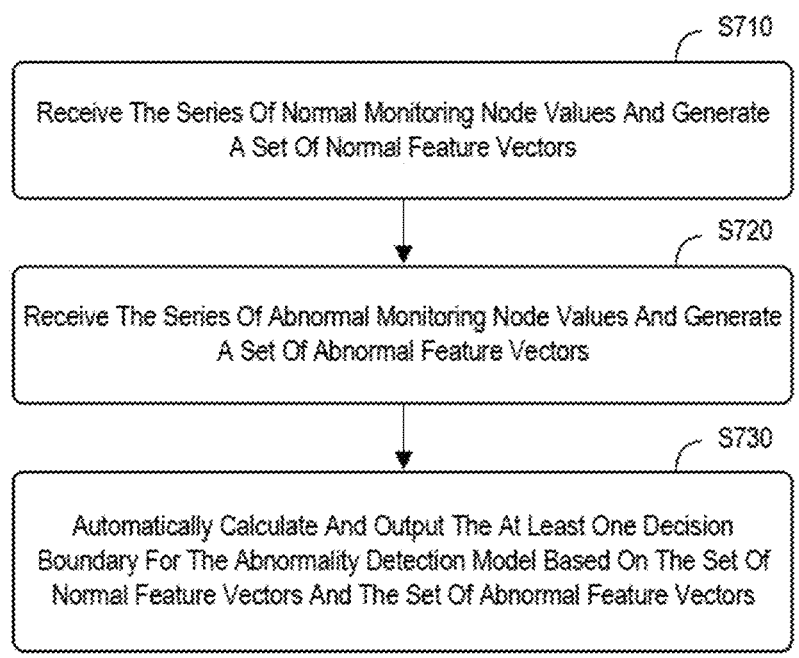
FIG. 7 is an abnormality detection model creation method according to some embodiments.

FIG. 7 illustrates a model creation method that might be performed by some or all of the elements of the system 100, 300 described with respect to FIGS. 1 and 3. At S710, the system may receive, for each of a plurality of monitoring nodes, a series of normal values over time that represent normal operation of the industrial asset and a set of normal feature vectors may be generated. At S720, the system may retrieve, for each of the plurality of monitoring nodes, a series of abnormal values over time that represent abnormal operation of the industrial asset and a set of abnormal feature vectors may be generated. The series of normal values might be obtained, for example, by DoE on an industrial control system associated with a power turbine, a jet engine, a locomotive, an autonomous vehicle, etc. At S730, a decision boundary may be automatically calculated and output for an abnormality detection model based on the sets of normal and abnormal feature vectors. According to some embodiments, the decision boundary might be associated with a line, a hyperplane, a non-linear boundary separating normal space from attacked space, and/or a plurality of decision boundaries. In addition, note that the abnormality detection model might be associated with the decision boundary, feature mapping functions, and/or feature parameters.

Thus, a system may classify the status of an industrial control system having a plurality of monitoring nodes (including sensor, actuator, and controller nodes) as being normal or abnormal. This may enable tailored, resilient, and fault-tolerant control remedies, including the deployment of virtual sensors, against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technique such as PCA. Note that the features may be calculated over a sliding window of the signal time series and the length of the window (and the duration of the slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time abnormality detection, decisions may be made by comparing where each point falls with respect to a decision boundary that separates the space between two regions (or spaces): abnormal ("attack" or "fault") space and normal operating space. If the point falls in the abnormal space, the industrial asset is undergoing an abnormal operation such as during a cyber-attack. If the point falls in the normal operating space, the industrial asset is not undergoing an abnormal operation such as during a cyber-attack or fault. In some embodiments, an appropriate decision zone with boundaries is constructed using data sets as described herein with high fidelity models. For example, support vector machines may be used with a kernel function to construct a decision boundary. According to some embodiments, deep learning techniques may be used to construct decision boundaries.

Note that industrial processes may be controlled by Programmable Logic Controllers ("PLC") with Ethernet ports and IP addresses. Computer worms can live in the PLC and be inactive for many days and can replicate itself into many targets as it finds them. IT and OT protection mechanisms cannot completely keep a PLC safe and different approaches may be needed to protect critical infrastructures from more advanced viruses and allow for an industrial asset to operate (including critical functions) even when being attacked. In particular some embodiments described herein provide a multi-node virtual sensor to sustain operation of an industrial asset with no loss of critical function. The virtual sensor might utilize, for example, some or all of the following information to estimate true signals; (1) information from localization about which nodes were attacked independently, (2) features from monitoring nodes, and (3) a multi-node feature-based virtual sensor model trained a priori from the system data set. Estimated true signals may then be used in the respective nodes instead of attacked signals.

In a control system during operational normalcy, the system may receive time series signals from various monitoring nodes (i.e., sensor, actuator, controller, etc.). Consider a general system (e.g., cyber physical system, software system, bio-mechanical system, network system, communication system, etc.) that contains access to continuous streams of data in the form of time series signals from all these sensors. The time series signals might be generated from a set of output sensor nodes ("y"; both physical and virtual sensors already incorporated in the system), a set of actuator nodes ("u"; both hard and soft actuators generated from open or closed loop system), a set of output of controller nodes ("c"; controller node signals), and a set of reference nodes ("r"; reference signals). According to some embodiments, logicals are also considered as time series signals. Some or all combinations of these signals may be used for the purpose of accommodation with a virtual sensor. The virtual sensor matrix used for this purpose may, for example, estimate not only system sensor outputs, y, when an attack takes place to any of the sensor nodes, but also other signals to the control system; actuator node signals, u, controller node signals, c; reference signals, r, etc. Thus, the virtual sensor-based accommodation system may provide an intelligent system that is designed to estimate signals that are corrupted/attacked from the healthy signals it receives.

Some embodiments described herein may provide a system and method for autonomous reconfigurable virtual sensing to neutralize the effect of anomalies (cyber-attack or faults) in system measurements. The system may provide correct estimates of compromised sensor measurements using uncompromised sensor measurements, thus replacing the comprised sensors with healthy virtual (or "soft") sensors. The autonomous, resilient estimator may use, according to some embodiments, continuous adaptive learning. For example, virtual sensor estimations may be computed online (during operation of the industrial asset) using an adaptive recursive method based on reinforcement learning. The system may be scalable, efficient, and automatically adjust its configuration to accommodate the time-varying uncompromised portion of the system sensors. Note that the system might work with partial, or no, a priori knowledge (e.g., a predetermined virtual sensor model).

Some embodiments described herein may provide a resilient estimation method for sensors of a control system to maintain the integrity and availability of the system under abnormalities such as cyber-attacks and sensor faults/failures. According to some embodiments, a virtual sensing system may satisfy some or all of the following four criteria:
1. the virtual estimator is unbiased (i.e., zero-mean error);
2. the virtual estimator has white innovation (optimal in the sense of a Cramer-Rao information bound);
3. the virtual estimator is statistically efficient (i.e., the error asymptotically converging to zero); and
4. the estimation error standard division is comparable to the real sensor measurement (so the quality of the virtual estimations is comparable with the physical sensor measurement).

Note that a system may receive time-series data from a collection of sensor monitoring nodes and replace independently attacked/faulty sensor(s) with their virtual estimate(s) as soon as an abnormality is detected. For each compromised sensor, the system may construct an autonomous, resilient estimator using uncompromised sensors. Each of such autonomous, resilient estimators can use all (or a subset) of the remaining healthy sensors. For example, for each sensor, an Analysis Of Variance ("ANOVA") or correlation/regression analysis may be performed to rank the contributing factors. The system may then down-select the significant sensors, which are desirable for virtual modeling of each particular on-line sensor estimator. Then, using the aforementioned ANOVA or correlation analysis, the list of the factors to be used in each virtual model may pre-stored into the system, while the virtual sensing model is learnt and adapted online.

Figure 8:
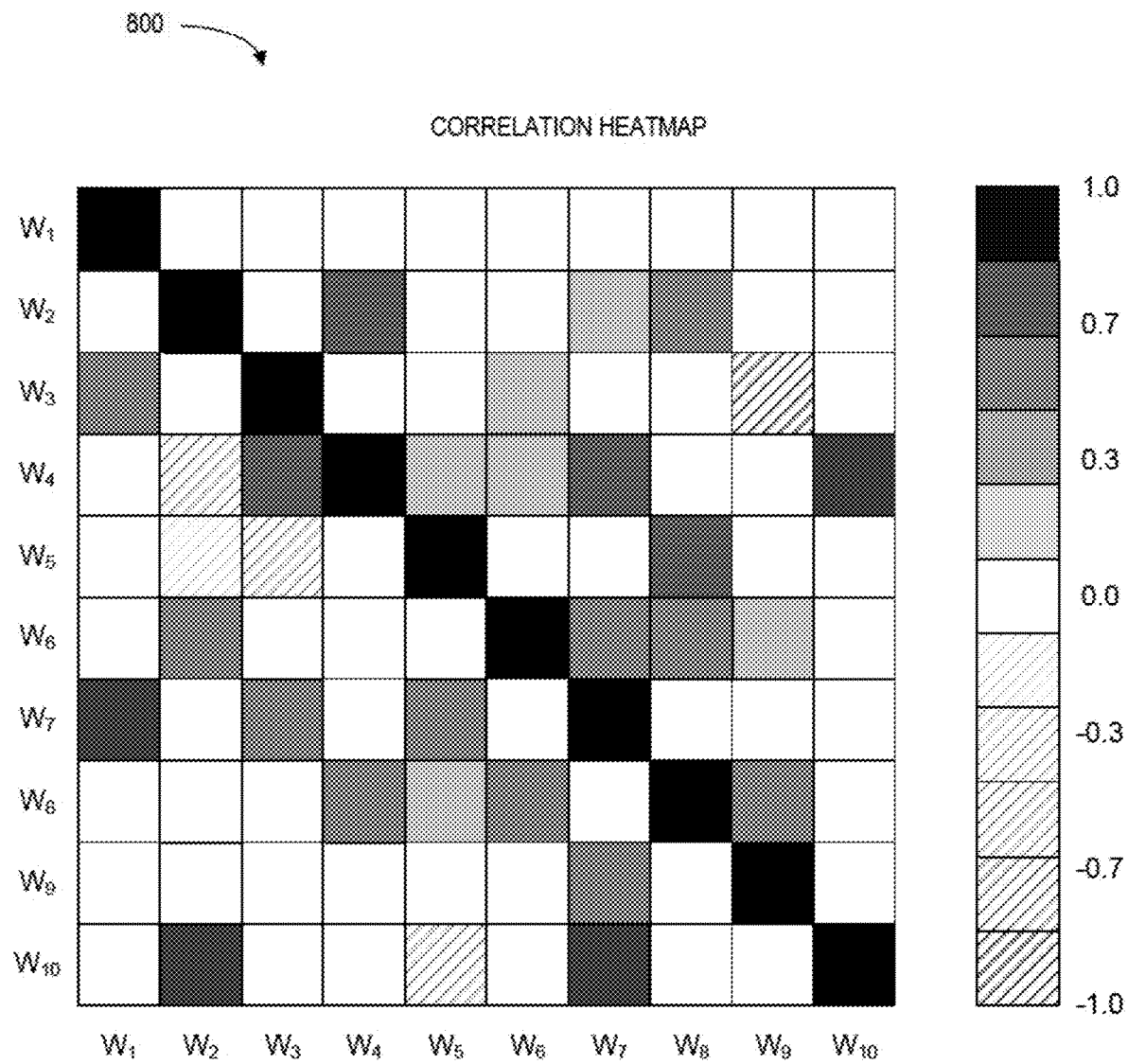
FIG. 8 is a correlation heat map of monitoring nodes in accordance with some embodiments.

For example, FIG. 8 shows a correlation heat map 800 for ten monitoring nodes (sensors/actuators/controller nodes) of a gas turbine. Pairs of values may each have a correlation scores (e.g., from 1 indicating a strong correlation to zero indicating no correlation to −1 indicating a strong negative correlation). For each node, the other nodes whose absolute value of the correlation coefficient is larger than a threshold (e.g., above 0.25) might be stored as main contributing factors. For the critical sensors of the system, or the ones that measure highly nonlinear dynamic phenomena, an off-line model could be learned and then adapted online. For the rest of the sensors, the on-line learning may start completely model-free and the models may be learned from scratch, in real-time during operation of the industrial asset. Note that a virtual sensor may utilize a lookup table, such as the table 900 illustrated in FIG. 9 including a virtual sensor matrix 910 and a signal being estimated 920, to create a value $Y_i = C_{i,j} X_i$ (where i represents the signals in feature space being estimated and j represents the number of attacked signals being estimated).

Some embodiments described herein may assume that when the attacked/faulty sensors are removed, the compromised plant remains observable. The continuous learning may be based on Reinforcement Learning ("RL") methodology. For example, an online learning algorithm such as Q-learning or the recursive least-squares method might be used for reinforcement learning. According to some embodiments, the approach might be interpreted as a Partially Observed Markov Decision Process ("POMDP") with continuous state and action spaces. This POMDP may exhibit, for example, deterministic transitions when configuration transitions are specified by a sensor diagnostics and anomaly classification module. A reinforcement learning engine can work on a deep neural network using Q-learning thus comprising a deep Q-network.

During normal operation, all sensors go into a reinforcement learning method running an online learning algorithm (e.g., a recursive least-square, a recursive weighted least square, Q-learning, etc.). This may comprise a "base" configuration of the system. The base configuration remains in place as long as there are no reported abnormalities (i.e., attacks or faults). Once an abnormality is reported, the virtual sensing system automatically adopts into a "partial" configuration for which the healthy sensors are the inputs and the estimates of both the compromised sensors as well normal sensors are the outputs. According to some embodiments, the system may keep the healthy sensors in the estimation loop (I.e., forming a full-order observer) so that at each instant a learnt model for virtual estimations of all sensors is readily available. In this way, if another sensor is suddenly compromised, the system will keep running without facing discontinuity in the underlying optimization procedures of continuous learning. Inside the partial configuration, all or a subset of inputs may be used to compute each particular output. The virtual sensor estimator may be a full-order observer both during the base and partial configurations, hence providing estimates of the measurements of the sensors at all times. The correlation analysis previously describe may be used to provide initial guess for the reward/penalty weighting functions in the reinforcement learning.

The continuous learning described herein may serve as a core of a model-free (or partial-model) Kalman filter, which receives partial or full measurements (depending of the status of the system) and provide full-order (or reduced-order) output estimates. A Kalman Temporal Differences technique may be used to implement the Kalman Filter. The described reinforcement learning based continuous learning framework may satisfies the conditions 1 through 4 previously mentioned as long as the plant remains observable through usage of the uncompromised subset of sensors. If the plant loses this observability due to large number of sensors being compromised, the system may still provide virtual sensor estimates but some or all of the conditions may no longer be satisfied. According to some embodiments, an online observability test may be performed using the models built online and a warning may be generated by the autonomous, resilient estimator in this situation. In addition, statistical tests (such as $X^2$ test) may be performed online using the innovation signal of the uncompromised sensor measurements, which are readily available verses their virtual estimates, which are part of the virtual estimator outputs.

Figure 10:
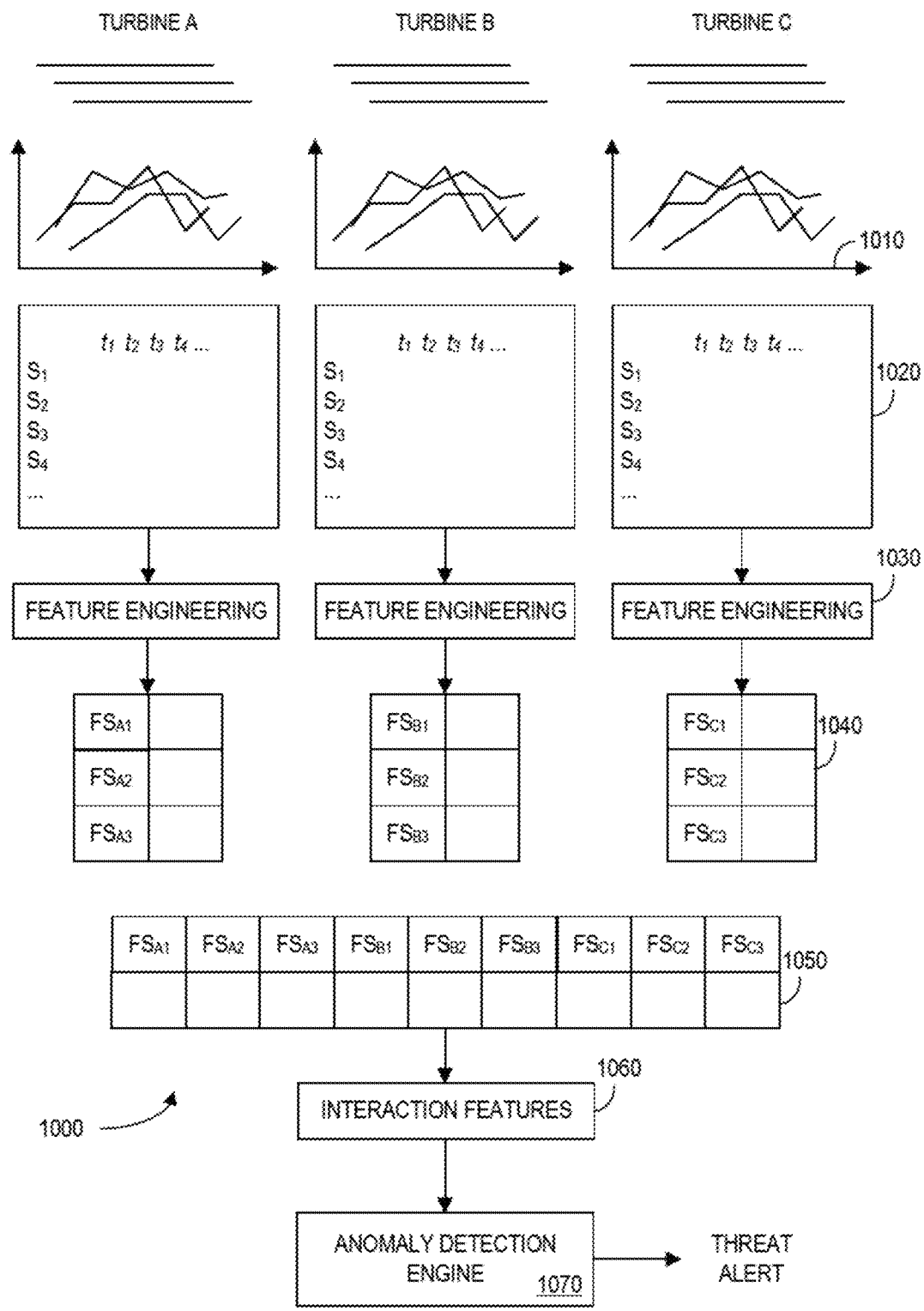
FIG. 10 is an example of a global threat protection system in accordance with some embodiments when multiple gas turbines are involved in a system.

Note that feature vectors might represent local or global information. For example, FIG. 10 is an example of a global threat protection system 1000 in accordance with some embodiments when multiple gas turbines are involved in a system. In particular, the system 1000 includes three turbines (A, B, and C) and batches of values 1010 from threat nodes are collected for each generated over a period of time (e.g., 60 to 80 seconds). According to some embodiments, the batches of values 1010 from threat nodes overlap in time. The values 1010 from threat nodes may, for example, be stored in a matrix 1020 arranged by time ($t_1$, $t_2$, etc.) and by type of threat node ($S_1$, $S_5$, etc.). Feature engineering components 1030 may use information in each matrix 1020 to create a feature vector 1040 for each of the three turbines (e.g., the feature vector 1040 for turbine C might include $FS_{C1}$, $FS_{C2}$, etc.). The three feature vectors 1040 may then be combined into a single global feature vector 1050 for the system 1000. Interaction features 1060 may be applied (e.g., associated with A*B*C, A+B+C, etc.) and an anomaly detection engine 1070 may compare the result with a decision boundary and output a threat alert signal when appropriate.

Figure 11:
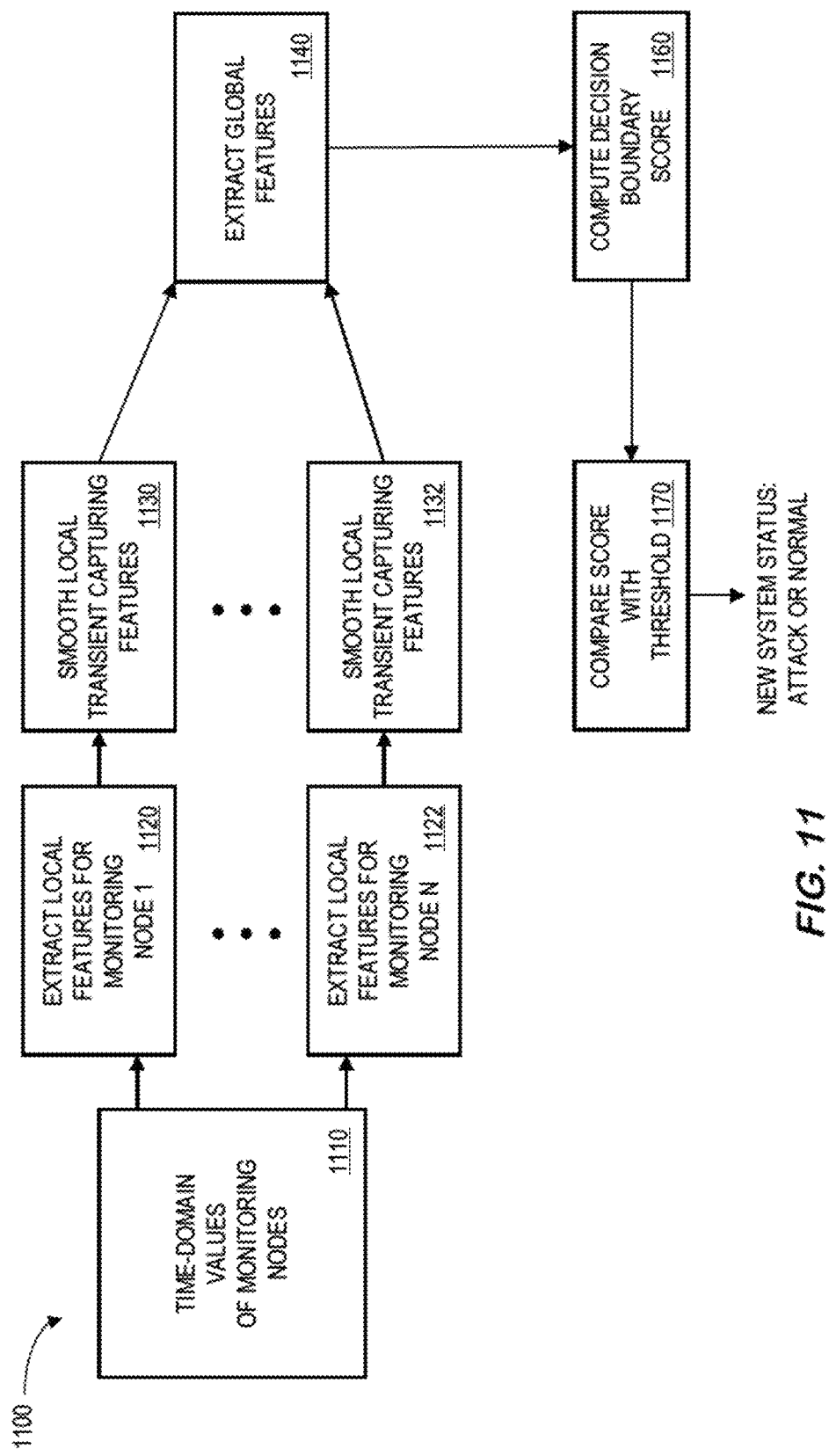
FIG. 11 is a high-level block diagram of a system to protect an industrial asset according to some embodiments.

Some embodiments described herein are directed to challenging problems encountered during rapid transients associated with an industrial asset (e.g., in a rapidly changing environment). For example, FIG. 11 is a high-level block diagram of a system 1100 to protect an industrial asset according to some embodiments. The system 1100 extracts local features for monitoring nodes 1-N 1120, 1122 from time-domain values 1110. The system 1100 then smooths local transient capturing features for each node 1130, 1132 (e.g., via band-pass filters). The system 1100 may also, according to some embodiments, extract global features 1140 and compute a decision boundary score 1160. The decision boundary score 1160 can then be compared to a threshold value 1170 to determine if the new system status of the industrial asset is "attack" or "normal."

Figure 12:
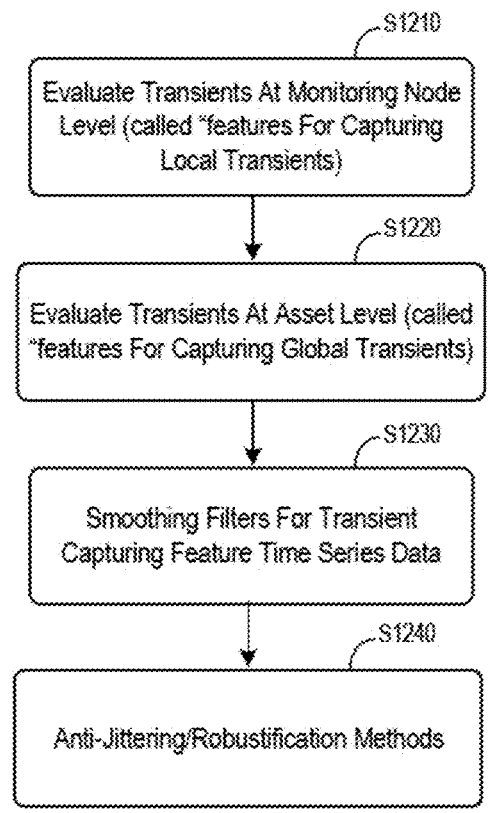
FIG. 12 is a more detailed method of protecting an industrial asset according to some embodiments.

FIG. 12 is a more detailed method of protecting an industrial asset according to some embodiments. At S1210, the system may evaluate transients at the monitoring node level (called 'features for capturing local transients'). At S1220, the system may evaluate transients at asset level (called "features for capturing global transients"). At S1230, smoothing filters may be applied for transient capturing feature time series data. At S1240, anti-jittering (e.g., robustification) methods may be employed in accordance with any of the embodiments described herein.

With respect to key features for capturing local transients, some embodiments may be associated with local transient capturing features of time-domain node values. For example, the local feature vector for each monitoring node might comprise of a set of "base features," which may be of any of the types described herein, augmented by a set of "transient capturing features" that provide, in rapid scale, a sense for the notion of change in the environment. In other words, the transient capturing features may characterize how fast the environment is evolving. In the following, a few types of transient capturing feature types will be described to enable such a distinguishing nature of rapid changes. The following description is for illustration purposes only and the transient capturing features are not limited to these specific types.

Some local transients capturing features may be associated with time-derivative local features of the time-domain values. That is, one particular type of transient capturing features might be the time derivate(s) of the monitoring node values. To this end, numerical differentiation can be used with central or backward finite differences. The numerical derivatives may be computed using the last points of the batched data. The number of points needed might be selected based on the order and type of the differentiation method. For example, the first and second derivatives using backward finite difference for monitoring node $x_1$ are:

$$\frac{dx_1}{dt}(t) = \frac{x_1(t) - x_1(t - T_s)}{T_s}$$

$$\frac{d^2 x_1}{dt^2}(t) = \frac{x_1(t) - 2x_2(t - T_s) + x_1(t - 2T_s)}{T_s^2}$$

where $T_s$ is the sampling time. Higher-order derivatives are also possible to compute, but for practical reasons (and depending on how noisy the data is) numerical differentiation beyond first and second derivatives may be impractical. The above computations are simple and low cost, and no additional storage might be required since a batch of time-series data (usually of the length of several $T_s$) may enter the system as each sampling time.

Transit capturing features can also be extracted as the features of the base features, capturing the evolution of the base features for each monitoring node. These are essentially "features of features." For example, time-derivative features of the local base features might be employed. These may be similar to the time-derivative features of the monitoring node values described above, and time-domain derivatives of the base features may also be computed from feature evolution time-series data. For example, if $w_1^1$ is the first local base feature of the first monitoring node $x_1$, then:

$$\frac{dw_1^1}{dt}(t) = \frac{w_1^1(t) - w_1^1(t - T_s)}{T_s}$$

$$\frac{d^2 w_1^1}{dt^2}(t) = \frac{w_1^1(t) - 2w_1^1(t - T_s) + w_1^1(t - 2T_s)}{T_s^2}$$

Note that, similar to the time-domain values of the monitoring nodes, after the base features are extracted, time-domain values of base features may also be readily available for each sliding batch. Also note that the sampling time, $T_s$, may not be same as the local features of time-domain data. Here again, the computations may be low-cost but additional storage may be needed since they involve features computed from previous batches of data.

Other embodiments might be associated with local "Jacobian features." Local Jacobian features are the partial derivatives of a base feature of a monitoring node with respect to another base feature of the same monitoring node. Suppose the local base feature vectors of an example monitoring node $x_1$ are $W^1 = [w_1^1 \ldots w_{f_1}^1]^T$, where $f_1$ is the number of local base features of the monitoring node $x_1$. The Jacobian of vector field $W^1$ with respect to itself, is a matrix with the main diagonal elements being 1:

$$J_{W^1}(W^1) = \begin{bmatrix} 1 & \frac{\partial w_1^1}{\partial w_2^1} & \cdots & \frac{\partial w_1^1}{\partial w_{f_1}^1} \\ \frac{\partial w_2^1}{\partial w_1^1} & 1 & \cdots & \frac{\partial w_2^1}{\partial w_{f_1}^1} \\ \vdots & \vdots & \ddots & \vdots \\ \frac{\partial w_{f_1}^1}{\partial w_1^1} & \frac{\partial w_{f_1}^1}{\partial w_2^1} & \cdots & 1 \end{bmatrix}$$

In this case, the local Jacobian features of $x_1$ are the non-diagonal elements of this matrix. Additionally, the properties of this matrix such as its trace, determinant, eigenvalues, etc. can be considered as local transit capturing features. The partial derivatives can be numerically computed using central or backward finite differences. For example, using backward finite differences:

$$\frac{\partial w_1^1}{\partial w_2^1}(t) = \frac{w_1^1(t) - w_1^1(t - T_s)}{w_2^1(t) - w_2^1(t - T_s)}$$

The local Jacobian features of the base features of other monitoring nodes may be computed in a similar fashion. Having n monitoring nodes each having $f_i$, $i = 1, \ldots, n$ local base features, in general, there exists n of such Jacobian matrices, each having $f_i*(f_i - 1)$ time-varying elements.

Still other embodiments may be associated with local Hessian features. The Hessian of a vector field with respect to another vector field (or itself) is a tensor of order three, which can be shown as an array of Hessian matrices of each element of the vector field with respect to the other (or the same) vector field. In this case, for example, the Hessian of a vector field $W^1$ (local base features of monitoring node $x_1$) with respect to itself is:

$$H_{W^1}(W^1) = \{H_{W^1}(w_1^1), H_{W^1}(w_2^1), \ldots, H_{W^1}(w_{f_1}^1)\}$$

For instance, $H_{W^1}(w_1^1)$ is the Hessian of the first local base feature $w_1^1$ with respect to the local base feature vector $W^1$, which is:

$$H_{W^1}(w_1^1) = \begin{bmatrix} 0 & 0 & \cdots & 0 \\ 0 & \frac{\partial^2 w_1^1}{\partial (w_2^1)^2} & \cdots & \frac{\partial^2 w_1^1}{\partial w_2^1 w_{f_1}^1} \\ \vdots & \vdots & \ddots & \vdots \\ 0 & \frac{\partial^2 w_1^1}{\partial w_{f_1}^1 w_2^1} & \cdots & \frac{\partial^2 w_1^1}{\partial (w_{f_1}^1)^2} \end{bmatrix}$$

Note that the first row and first column of this matrix are zero. For monitoring node $x_1$ with $f_1$ local base feature, there are $f_1$ such Hessian matrices. The local Hessian features of node $x_1$ are the non-zero elements of those matrices. The second partial derivate can also be computed numerically using central or backward finite differences. More efficiently, the Hessian matrix may be computed using Hessian Automatic Differentiation ("HAD").

The local features for each monitoring node (e.g., after de-noising) may be stacked to create a global feature vector. The global feature vector may also contain interactive feature involving two or more monitoring nodes, e.g. cross-correlation between two nodes. According to some embodiments, the features may be normalized. The dimension of the global feature vector can then be further reduced using any dimensionality reduction technique such as PCA. Note that the transient capturing features may be left out of such dimensionality reduction. The features may be calculated over a sliding window of the signal time-series. The length of the window and the duration of slide might be determined, for example, from domain knowledge and inspection of the data, detection performance, and computing resources. The interactive global features may also contain global transit capturing features involving two or more nodes.

Global transient capturing features are essentially the partial derivatives of a time-domain values of a monitoring node with respect to other monitoring nodes, or the partial derivatives of the local features of a monitoring node with respect to the local features of other monitoring nodes. According to some embodiments, global transient capturing features of time-domain node values may be utilized, such as a Jacobian feature of the time-domain values of the monitoring nodes. These features may be computed as the first partial derivatives of time-domain values of a monitoring node with respect to another node. For example, suppose there are n monitoring nodes, $X=[x_1, x_2, \ldots, x_n]^T$. The Jacobian of vector field X with respect to itself is:

$$J_X(X) = \begin{bmatrix} 1 & \frac{\partial x_1}{\partial x_2} & \cdots & \frac{\partial x_1}{\partial x_n} \\ \frac{\partial x_2}{\partial x_1} & 1 & \cdots & \frac{\partial x_2}{\partial x_n} \\ \vdots & \vdots & \ddots & \vdots \\ \frac{\partial x_n}{\partial x_1} & \frac{\partial x_n}{\partial x_2} & \cdots & 1 \end{bmatrix}$$

The off-diagonal elements can then be considered as global transit capturing features. The partial derivatives can be computed using central or backward finite differences. For example, using backward finite differences:

$$\frac{\partial x_1}{\partial x_2}(t) = \frac{x_1(t) - x_1(t - T_s)}{x_2(t) - x_2(t - T_s)}$$

Other embodiments may use a Hessian feature of the time-domain values of the monitoring nodes. This is the Hessian of the vector field X with respect to itself a tensor of order three which is represented by an array of Hessian matrices, similar to the local Hessian features:

$$H_X(X) = \{H_X(x_1), H_X(x_2), \ldots, H_X(x_n)\}$$

For example, for $H_x(x_1)$:

$$H_X(x_1) = \begin{bmatrix} 0 & 0 & \cdots & 0 \\ 0 & \frac{\partial^2 x_1}{\partial (x_2)^2} & \cdots & \frac{\partial^2 x_1}{\partial x_2 x_n} \\ \vdots & \vdots & \ddots & \vdots \\ 0 & \frac{\partial^2 x_1}{\partial x_n x_2} & \cdots & \frac{\partial^2 x_1}{\partial (x_n)^2} \end{bmatrix}$$

Note that there are n of such Hessian matrices, each having $(n-1)^2$ non-zero elements. The Hessian matrix of the measurements of a physical system, satisfies Schwartz condition of continuous partial differentiability and is, therefore, symmetric. Hence, there are $n(n-1)/2$ distinct time-varying elements in each matrix which can be considered as global transit capturing features. Note that each Hessian matrix can then be computed using numerical or automatic differentiation.

Some embodiments may utilize global transient capturing features of the local features. For example, a Jacobian of the local features vector of one node with respect to another. Note that the global Hessian feature of the feature is computed as the second partial derivative of one feature of a mentoring node, with respect to the vector field of the local features of another monitoring node. For instance, the Jacobian of $W^1$ (local base features of monitoring node $x_1$) with respect to the vector field $W^2$ (local base features of monitoring node $x_2$) is a $f_1*f_2$ matrix:

$$J_{W^2}(W^1) = \begin{bmatrix} \frac{\partial w_1^1}{\partial w_1^2} & \frac{\partial w_1^1}{\partial w_2^2} & \cdots & \frac{\partial w_1^1}{\partial w_{f_2}^2} \\ \frac{\partial w_2^1}{\partial w_1^2} & \frac{\partial w_2^1}{\partial w_2^2} & \cdots & \frac{\partial w_2^1}{\partial w_{f_2}^2} \\ \vdots & \vdots & \ddots & \vdots \\ \frac{\partial w_{f_1}^1}{\partial w_1^2} & \frac{\partial w_{f_1}^1}{\partial w_2^2} & \cdots & \frac{\partial w_{f_1}^1}{\partial w_{f_2}^2} \end{bmatrix}$$

Some embodiments may use a Hessian of the features of one node with respect to another. In this case, a global Hessian feature of the feature may be computed as the second partial derivative of one feature of a mentoring node with respect to the vector field of the local features of another monitoring node. For instance, the Jacobian of $W^1$ (local base features of monitoring node $x_1$) with respect to the vector field $W^2$ (local base features of monitoring node $x_2$):

$$H_{W^2}(W^1) = \{H_{W^2}(w_1^1), H_{W^2}(w_1^2), \ldots, H_{W^2}(w_{f_1}^1)\}$$

where $H_{W^2}(w_1^1)$ is the Hessian of $w_1^1$ (first local feature of node $x_1$) with respect to the vector field $W^2$ (local base features of monitoring node $x_2$). Having n monitoring nodes, the global Hessian feature of features will be the elements of n such tensors (each being an array of matrices).

Note that extracting transient capturing features involves differentiations which is known to be a noise-prone process. In order to de-noise the resulting features, these features may be smoothened at the local and/or global levels. The smoothing filters might comprise, for example, band-pass filters with very a low cut-in frequency (just to filter the fictitious DC value which may exists as an artifact of numerical derivatives) and a cut-off frequency which may be selected by inspecting the power spectral density of the signals. The bandwidth of the filter can be automatically selected to be, for example, the first 5 harmonics of the signal. The order of the filter may be selected by the maximum phase distortion allowed while still capturing the fastest normal transient of the environment. For example, a noise-robust 5-point differentiator can be derived as:

$$\frac{dx}{dt}(t) = \frac{5x(t) + 2x(t - T_s) - 8x(t - 2T_s) - 2x(t - 3T_s) + 3x(t - 4T_s)}{8T_s}$$

Polynomial-based smooth noise-robust filters, such as a Savitzky-Golay smooth differentiation filter, can also be used. According to some embodiments, FFT-based filters with zero-phase distortion can be applied to smoothen transient capturing features. FFT-based filters may transform the feature time series into the frequency domain and then apply a zero-phase band-limited (or low-pass) filter. An inverse FFT can then be performed to obtain a filtered feature time-series data.

During the off-line training phase, normal and abnormal data sets may be generated (including fast transients), and the global feature vectors, including the smoothed transient capturing features, may be extracted to train a classification decision boundary. The classification decision boundary could be based on any classification method, such as Support Vector Machines ("SVM"), K-nearest neighborhood, deep learning neural networks, Extreme Learning Machines ("ELM"), etc. The computed decision boundary can then be pre-stored in the system for real-time operations. It might comprise, for example, a mathematical score function of the global features and a score threshold which determines whether the current system status is normal or abnormal.

Figure 13:
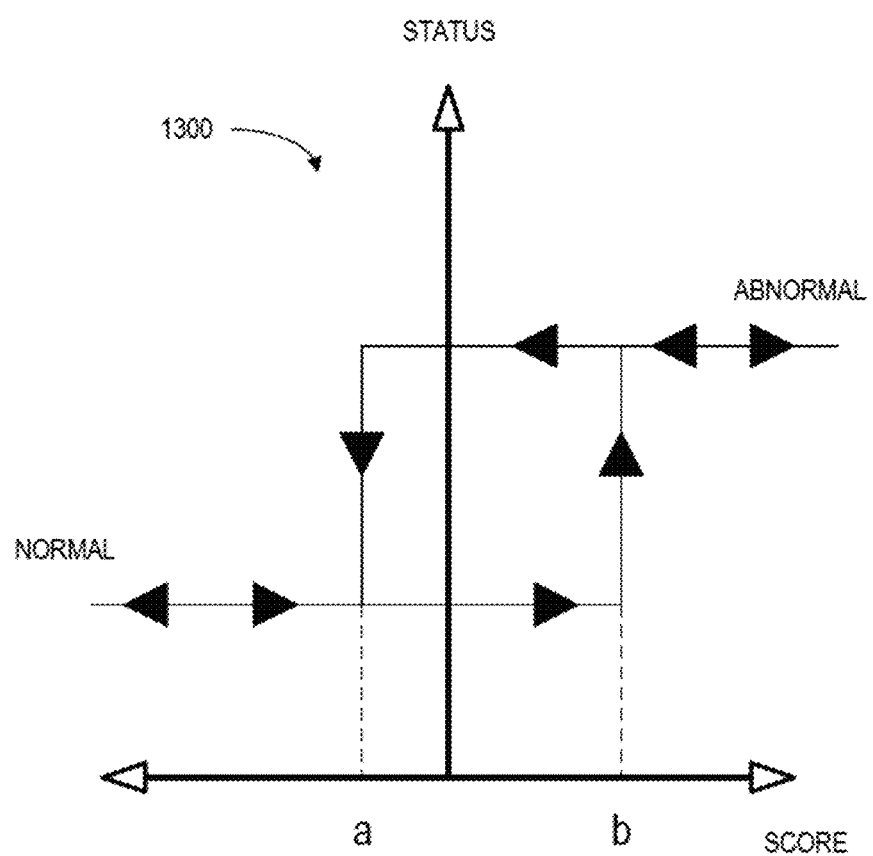
FIG. 13 illustrates an anti jitter process in accordance with some embodiments.

FIG. 13 illustrates an anti-jitter process 1300 in accordance with some embodiments. Note that during the real-time operations the classification decision boundary computes a score at each sampling time, which is then compared to a pre-stored score threshold. In order to avoid jittering around the score threshold, which could happen due to the fast-changing nature of the transient capturing features, an anti-jittering hysteresis mechanism may be applied around the threshold. Suppose that the decision boundary is trained such that a negative score resembles "normal" status and a positive score resembles "abnormal" status. Note that a hysteresis function is not necessarily symmetric and can have two different trigger edges a>0 and b<0 as the score threshold (illustrated in FIG. 13).

The system may use the current system status to apply the proper score threshold. If the current status is "normal," it remains "normal" until score>a, at which point the new status becomes "abnormal." If the current status is "abnormal," it remains "abnormal" until score<b, at which point the new status becomes "normal."

The family of transient capturing featuring described here constitutes a large number of features that could be extracted in addition to the base features to create a reliable decision boundary. Any subset of these features, or features of the similar nature, could be used for any particular application. Suppose there are n monitoring nodes, each having $f_i$, i=1, . . . , n local base features. The features of the time-domain node values might include the first derivative, the second derivative, Jacobian information (e.g., determinants, trace, eigenvalues, singular values), Hessian information, etc. The features of the base (local) features might include the first derivative, the second derivative, Jacobian information (e.g., determinants, trace, eigenvalues, singular values), Hessian information, etc.

Current anomaly/threat detection methods do not perform well under system transients and misclassify the transient normal operation as abnormal, causing false alarms during transients. Embodiments described herein may provide a reliable, low-cost, and computationally efficient solution. Some advantages of embodiments described herein include: carrying out cyberattack detection during continuous operational mode (especially during rapid transients such as Dry Low NOx ("DLN") mode transfer in a gas turbine); detection may be more sensitive to fast transients and reduces false positive rate; an analytics application for digital monitoring system, etc.

Embodiments might be tested using various simulations of a gas turbine. For example, an asset may have 20 monitoring nodes, each having 5 local base features, including, median, standard deviation, kurtosis, range, and a moving average. The features may be extracted, for example, over a sliding window of batch data of node measurements of size 50 second, sliding by one sampling time (Ts=1 sec) at each sampling time. In addition, one transient capturing feature might be added, namely the first derivative of the time-domain node values (rate features) as the 6-th local feature for each node. The transient capturing feature for each node might then pass through a 5-degree smoothing filter. At the global level, there may be two interactive features as the correlation of two monitoring nodes used in those features. The global feature vector might be comprised of 122 features (6 local per node plus 2 global interactive). Then a classification decision boundary could be trained based on ELM neural networks using "normal" and "abnormal" data sets collected by simulating a high-fidelity model of the asset. The "normal" data set might be created by Pseudo-Random Binary Sequence ("PRBS") excitation to resemble different operational conditions, and the "abnormal" data set might be created by DoE. The features can then be extracted over a sliding window of the time-series data. The training data set might comprise, for example, over 2 million data points, each being a vector of size 122, in the feature space. The ELM training code is implemented efficiently, using sparse matrix manipulations, to be able to handle the big data. To resemble real operations, the simulations may be done in close-loop with the gas turbine controller in the loop. The results may then be compared with the results of another classification decision boundary (using the same classification methods and same data sets) in which only base features are used (no transient capturing features included) as the base-line. The performance of the reliable cyber-threat detection system in various test scenarios may not create false alarms during rapid normal transients and DLN mode transfers, while still detecting attacks even faster than the base-line classifier. The transient capturing features may improve both sensitivity and accuracy of the detection system. Moreover, the reliable system may be computationally low-cost and not add a noticeable demand to real-time computational needs.

Figure 14:
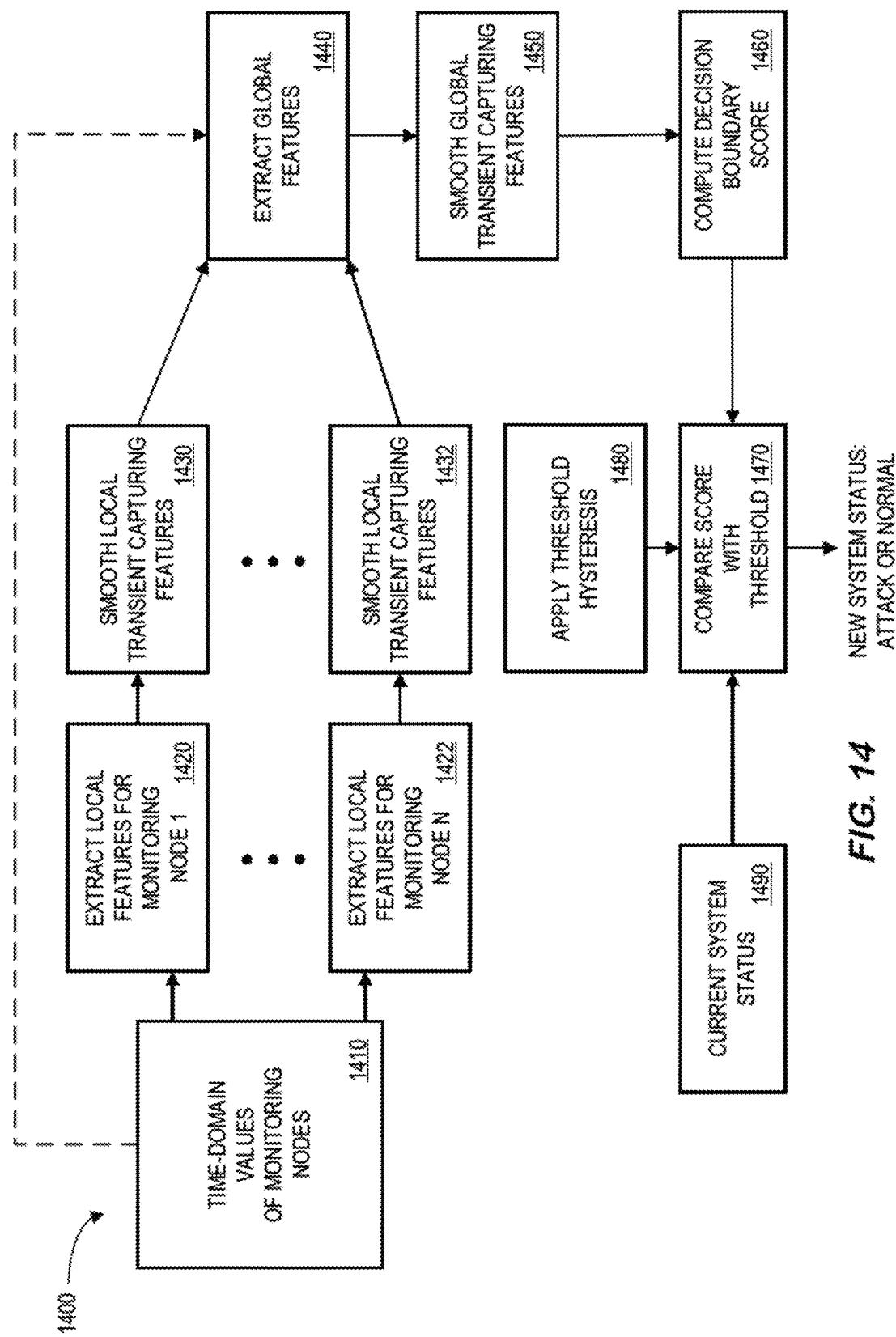
FIG. 14 is a more detailed architecture of a system to protect an industrial asset according to some embodiments.

FIG. 14 is a more detailed architecture of a system 1400 to protect an industrial asset according to some embodiments. The system 1400 extracts local features for monitoring nodes 1-N 1420, 1422 from time-domain values 1410. The system 1400 then smooths local transient capturing features for each node 1430, 1432. The system 1400 may also, according to some embodiments, extract global features 1440, smooth the global transient capturing features 1450, and compute a decision boundary score 1460. According to some embodiments, the extraction of global features 1440 may also utilize the time-domain values of monitoring nodes 1410 (e.g., to allow cross-correlation as illustrated by the dashed arrow in FIG. 14). The decision boundary score can then be compared 1470 to a threshold value 1470 based on an applied threshold hysteresis 1480 and a current system status 1490 to determine if the new system status of the industrial asset is "attack" or "normal."

Figure 15:
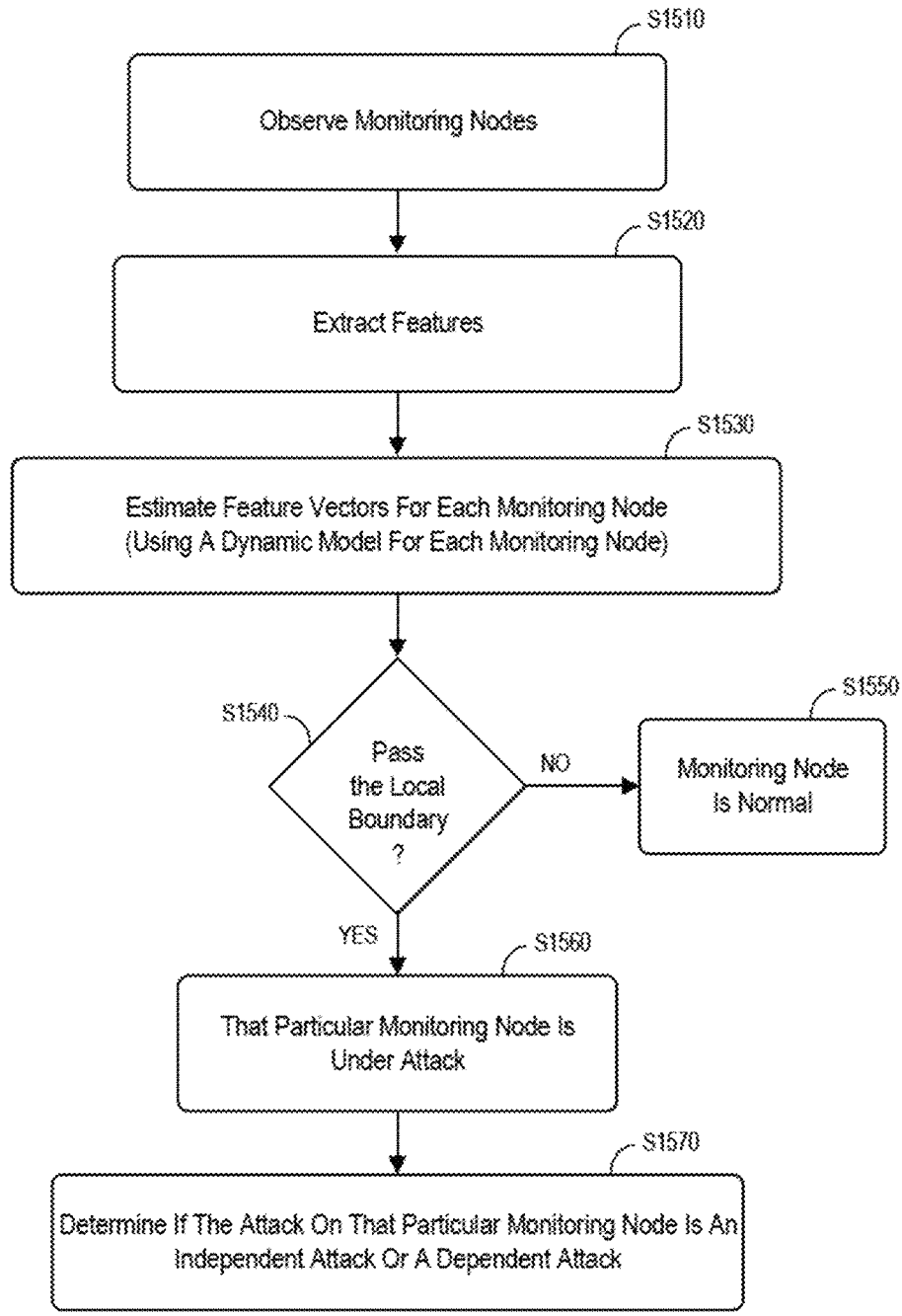
FIG. 15 is a method that might be associated with an on-line operational process in accordance with some embodiments.

FIG. 15 is a method that might be associated with an on-line operational process in accordance with some embodiments. After observing the monitoring nodes at S1510, the features are extracted at S1520 from each observation of each monitoring node. Then using the dynamic models identified in a training phase, each model then generates filtered or estimated features at S1530 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S1540, also computed and pre-stored during the training phase. If the local boundary is not passed at S1540, the monitoring node is normal at S1550. Each monitoring node with an estimated feature that violates the corresponding decision boundary is reported as being under attack at S1560.

In the next stage, the system post-processes the localized attack and determines whether the detected attack is an independent attack or it is an artifact of the previous attack through propagation of the effects in the closed-loop feedback control system at S1570. This may provide additional information and insight and may be useful when multiple attacks are detected at the same time.

Figure 16:
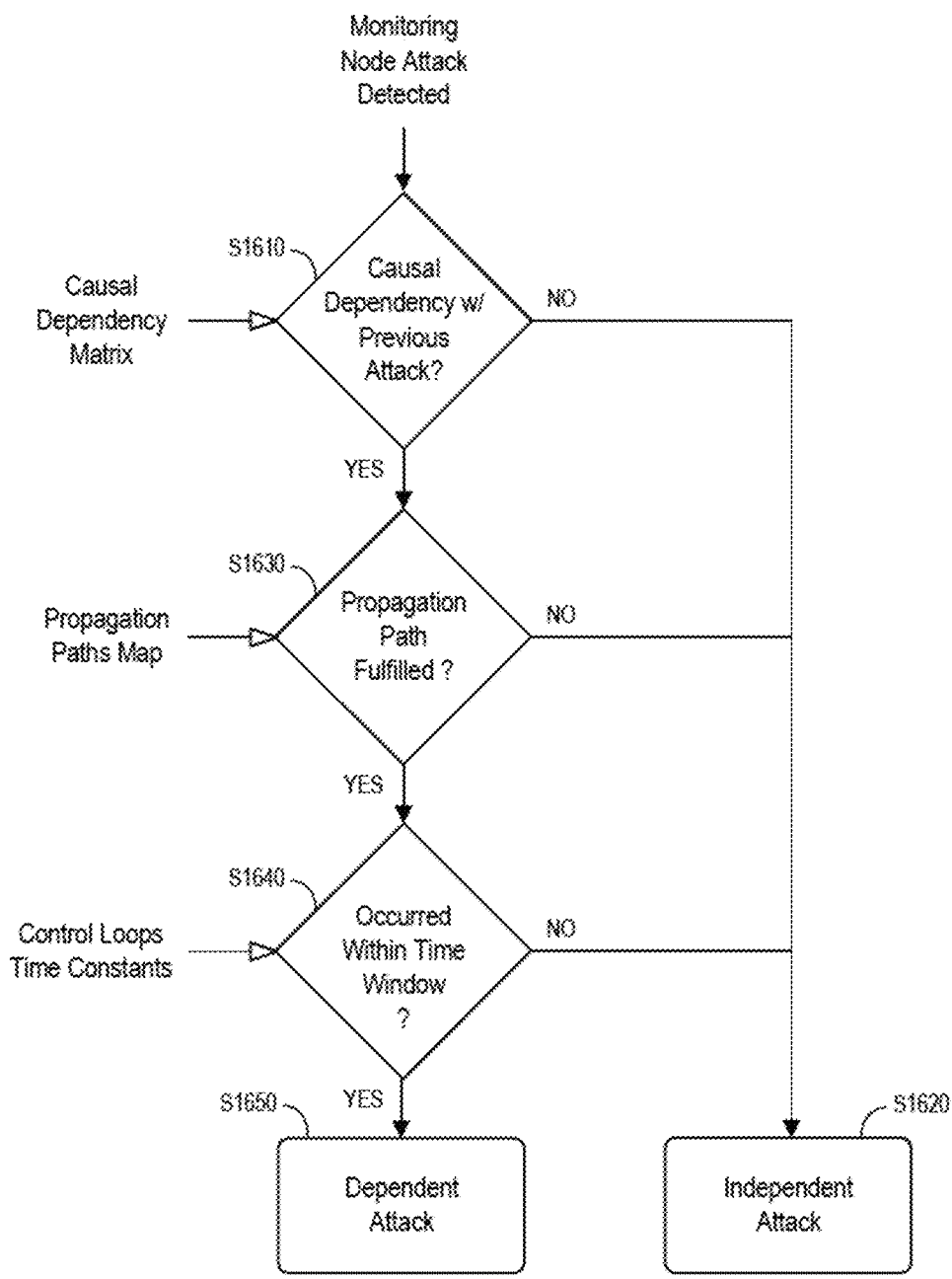
FIG. 16 is a method of determining whether an attack is an independent attack or a dependent attack according to some embodiments.

For example, FIG. 16 is a method of determining whether an attack is an independent attack or a dependent attack according to some embodiments. According to some embodiments, three tests may be performed to determine if an attack should be classified as an "independent attack" or a "dependent attack:" (1) a causal dependency test, (2) a propagation path test, and (3) a time separation test. Together, these three tests are referred to herein as the "attack dependency conformance test." At S1610, a causal dependency matrix may be used to determine if the current attack was potentially caused by a previous attack. If the current attack could not have been caused by a previous attack at S1610, it is classified as an "independent attack" at S1620. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 16). The causal dependency matrix might be generated; according to some embodiments, based on domain knowledge. If no such possible dependencies exist, the attack is reported as an "independent attack" at S1620. Otherwise, the system may perform a second check.

In particular, at S1630 a propagation paths map may be used to determine if the current attack potentially propagated from a previous attack. If the current attack could not have propagated from a previous attack at S1630, it is classified as an "independent attack" at S1620. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1620. Otherwise, the system may perform the third check.

At S1640, control loops time constraints may be used to determine if the current attack was potentially caused by a previous attack based on time separation. If the current attack could not have been caused by a previous attack based on time separation at S1640, it is classified as an "independent attack" at S1620. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau+n*p<\Delta t<5*\tau+n*p$$

where Δt is the time after any previously detected attacks on other nodes that has passed checks 1 and 2, and τ is the time constant of the control loop responsible for the current node under investigation. If such a time-separation check is not passed, the system reports the attack as an independent attack at S1620.

If it is determined at S1650 that the current attack meets the time separation test (and, therefore, also meets both the propagation test of S1630 and the causal dependency test of S1640), the current attack is classified as a "dependent attack" at S2150.

Note that other attack and anomaly detection techniques may only provide a binary status of the overall system (whether it is under attack or not). Embodiments described herein may provide an additional layer of information by localizing the attack and determining not only if the system is under attack (or not) but also which node is exactly under attack.

As a result, embodiments may provide a significant and automated solution to attack localization. Note that the attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large-scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 17:
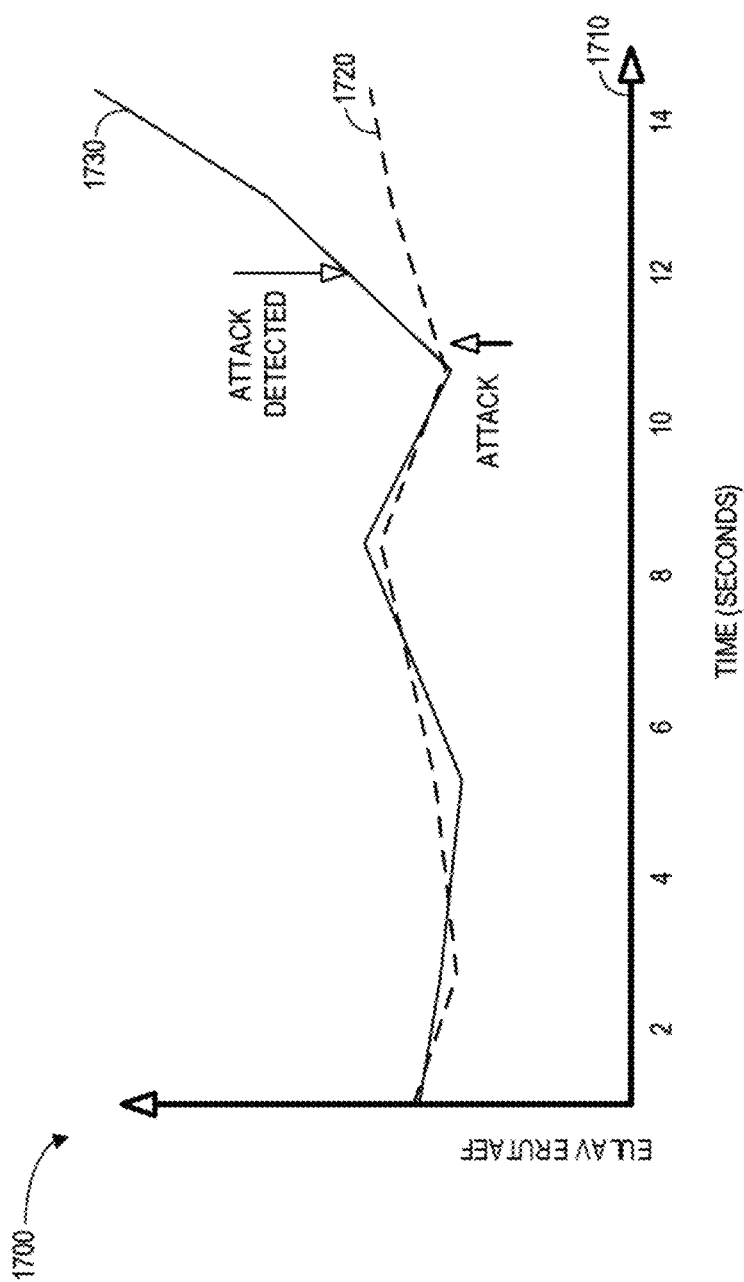
FIG. 17 illustrates a feature time series of an attack comparing the real-time feature of a monitoring node to the modeled feature of the monitoring node according to some embodiments.

FIG. 17 illustrates a feature time series 1700 of a first attack example comparing the real-time feature of a monitoring node to the modeled feature of a monitoring node via a graph 1710 according to some embodiments. In particular, the examples described with respect to FIGS. 17 through 16 involve the following parameters for a gas power turbine (similar to those values described with respect to FIGS. 4 through 6):

Compressor Discharge Pressure ("CPD"),
Compressor Discharge Temperature ("CTD"), Compressor Inlet Temperature ("CTIM"),
Turbine Fuel Flow ("FQG"),
Generator Electrical Power Output ("DWATT"), and
Turbine Exhaust Temperature ("TTXM").

Consider, for example, an attack on TTXM. In this single attack scenario, the system may want to verify whether it can detect and localize the attacked node. As illustrated in FIG. 17, the attack is detected at t=11 sec. Using the embodiments described herein, the attack is detected within 1 sec and correctly localized to TTXM. FIG. 17 shows the measured feature time series of the detected and localized attack 1730 along with the generated features 1720 estimated using stochastic model-based estimation.

Figure 18:
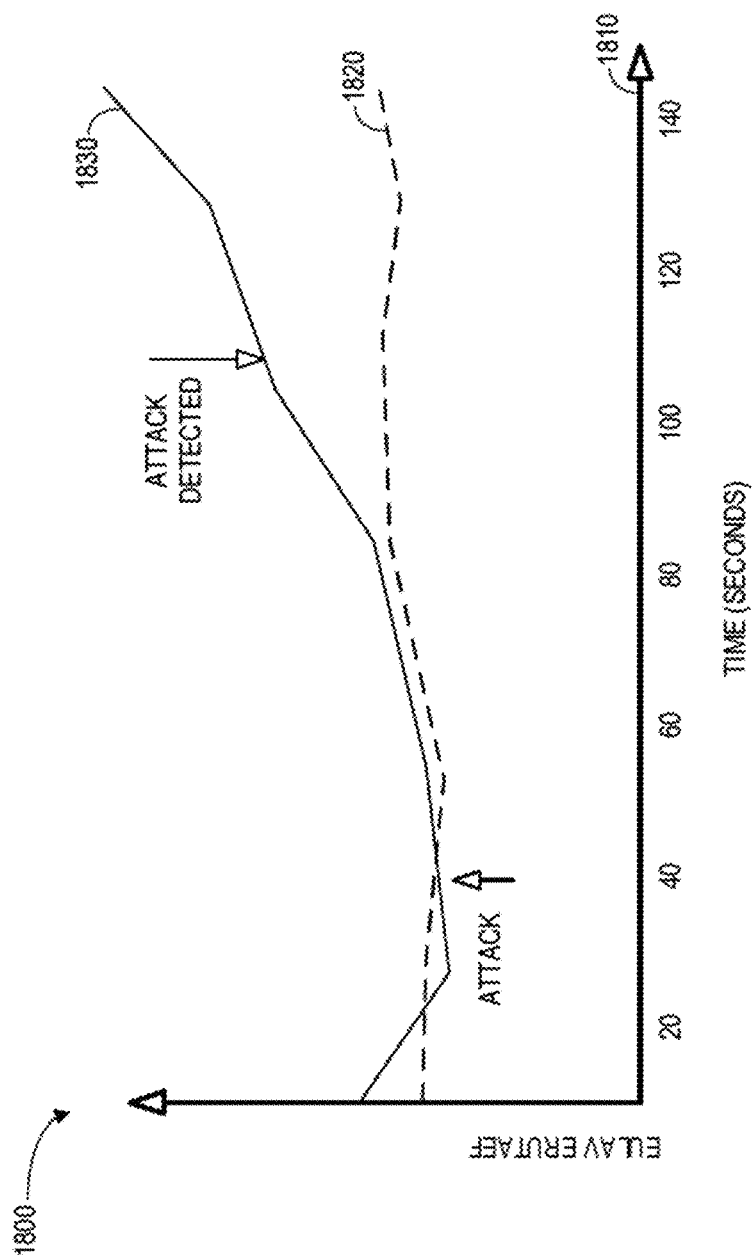
FIG. 18 illustrates a feature time series of a stealthy attack comparing the real-time feature of a monitoring node to the modeled feature of a monitoring node in accordance with some embodiments.

FIG. 18 illustrates a feature time series 1800 via a graph 1810 of a second (stealthy) attack comparing the real-time feature of a monitoring ode to the modeled feature of a monitoring node in accordance with some embodiments. That is, this is again an attack on TTXM but this time the attack simulates a stealthy attack in which the sensor is tampered with slowly over time and/or elaborately. Such stealthy attacks are designed to pass the existing fault diagnosis system and can remain in the control system for a long time without being detected. In this simulation, the attack was applied at t=40 sec. Using the localization methods described herein, the attack was detected at t=105 sec, and is correctly localized to TTXM. FIG. 18 shows the measured feature time series of the detected and localized attack 1830 along with the expected features 1820 estimated using the stochastic model-based estimation.

Figure 19:
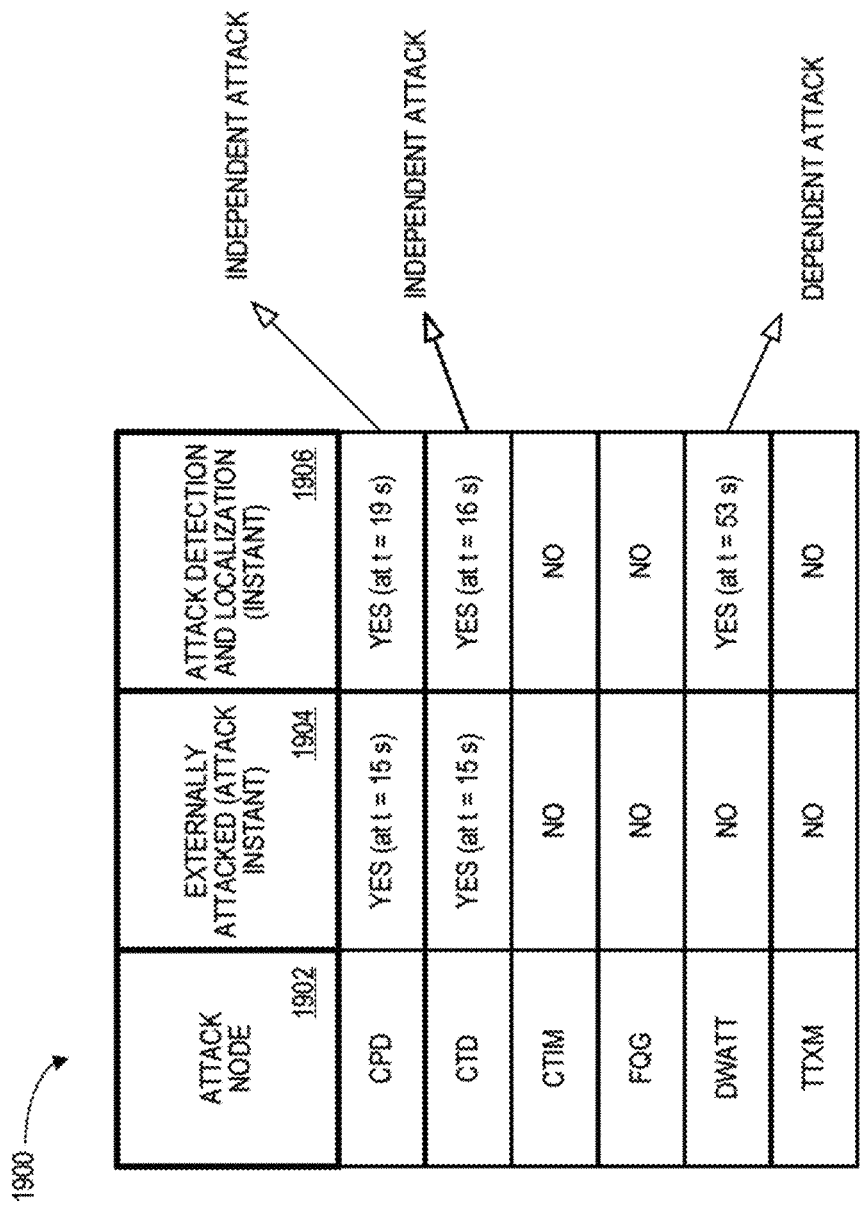
FIG. 19 is an example of attack localization in a multiple-attack scenario according to some embodiments.

In a third attack scenario, the system may simulate a simultaneous attack on two monitoring nodes. Two sensors are attacked at the same time, namely CPD and CTD, and both attacks are applied at t=15 sec. Using embodiments described herein, both attacks are truly detected and localized within seconds. Out of the other 4 sensors, 3 are correctly not detected at all. One is detected (DWATT) at a later time, which is dependent attack. The results are summarized in the table 1900 of FIG. 19. In particular, the table 1900 lists the attack nodes 1902 along with associated externally attacked data 1904 and attack detection and localization data 1906.

In this third example (illustrated in the table 1900), there are two externally injected attacks on CPD and CTD. The first attack is detected at t=16 sec and localized to CTD. Since there is no previously detected attack, the causality test fails and this attack is correctly reported as an "independent attack." The second attack is detected at t=19 sec and correctly localized to CPD. In this case, there is causal dependency and a direct proportion path from CTD to CPD. The causal dependency matrix 2000 for this example is shown in FIG. 20. The matrix 2000 lists each potential attack node and whether or not that node can have an effect on each other node (with a "1" indicating a potential effect and a "0" indicating no potential effect).

The second attack therefore passes both the causality test and the proportion test. However, based on time separation criterion, in order for the CPD attack to be a dependent attack it must have happened within $4.25<\Delta t<9.5$ sec after the CTD detection instance. The actual $\Delta t$ illustrated in the table 1900 is 3 sec (that is, 19 sec–16 sec). Therefore, the time separation test is not passed and, as a result, the CPD attack is correctly reported as an "independent attack."

At t=53 sec, the DWATT sensor is also reported as being under attack. Note that there are two previously reported attacks, and the causality and propagation tests pass for both previous attacks (as shown in the matrix 2000). Using the time separation criterion, the DWATT attack instant must be with $15.5<\Delta t<47$ sec after those attacks. The table 1900 lists the actual $\Delta t$ as $\Delta t$=53 sec–16 sec=37 sec for CTD attack and $\Delta t$=53 sec–19 sec=34 sec for CPD attack. So, the time separation test passes for both previous attacks and, therefore, the DWATT attack is correctly reported as a "dependent attack." Note that, based some embodiments described herein, passing the time separation test even for one previously detected attack may still be enough to report DWATT as a dependent attack.

Figure 21:
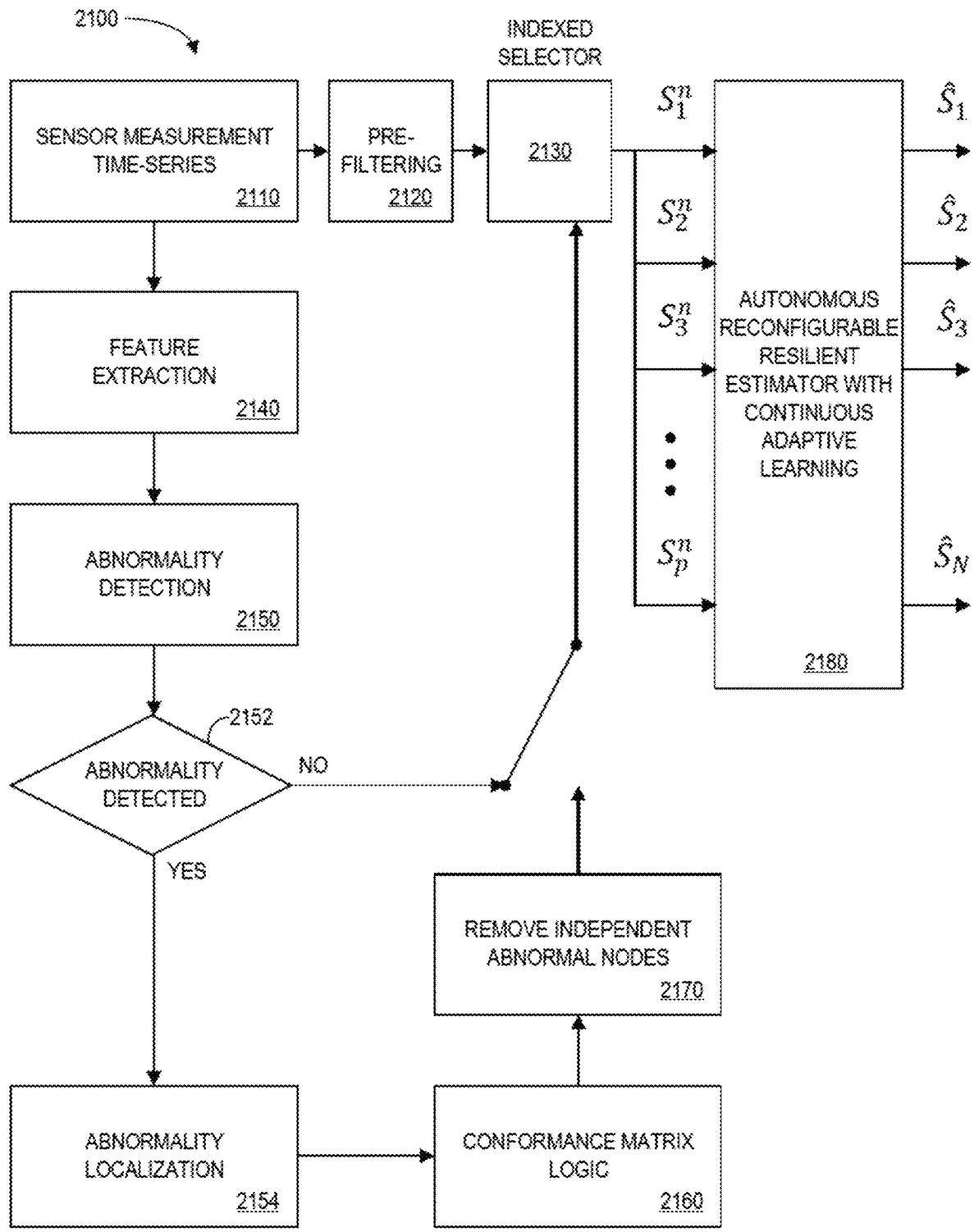
FIG. 21 is an autonomous reconfigurable virtual sensing system architecture according to some embodiments.
Figure 22:
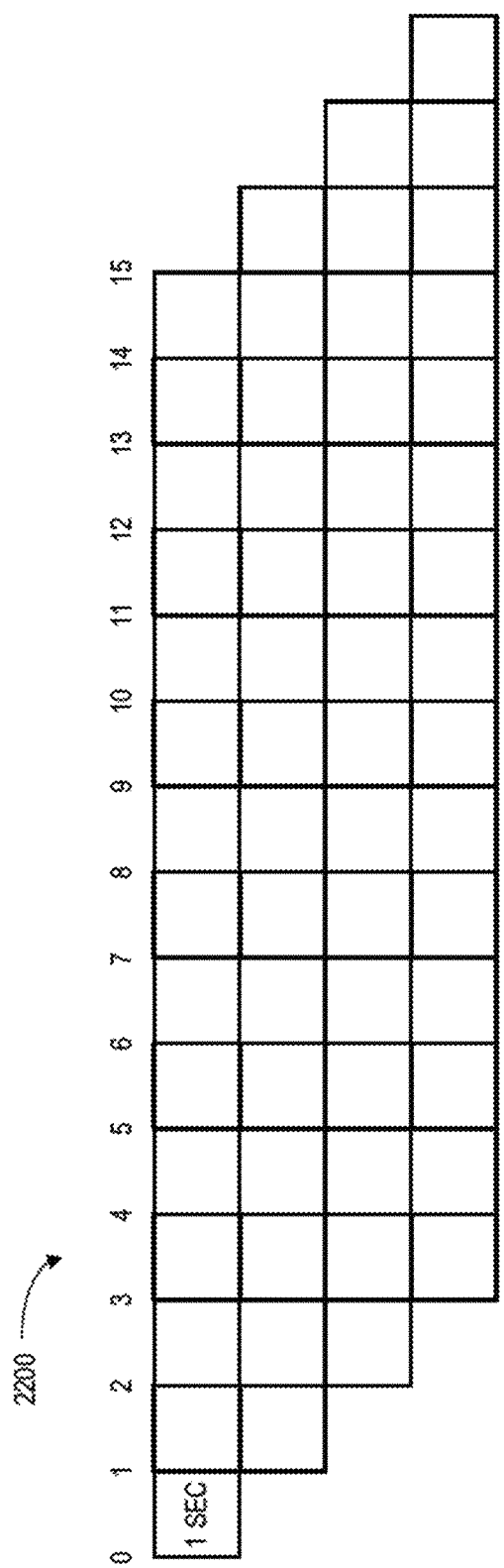
FIG. 22 illustrates a sliding window technique for real-time measurements in accordance with some embodiments.

FIG. 21 shows an architecture for an autonomous reconfigurable virtual sensing system 2100. The system 2100 receives time-series measurements 2120 of the sensors as inputs. The measurements are pre-filtered 2120 for denoising and outlier removal. Denoising may be done, for example, by low pass filtering using law pass filters whose individual cut-off frequencies may be turned based on the individual bandwidths of each sensor. Outlier removal might be performed online by computing the standard deviation of measurements over a sliding window. For example, FIG. 22 illustrates a sliding window 2200 including a series of values per second. Referring again to FIG. 21, feature extraction 2140, anomaly detection 2150, and localization techniques 2154 may be used to determine 2152 if there is any anomaly in the sensor (and to specify the particular anomalies). When an anomaly or abnormality exists in the system 2100, all the sensor measurements may be passed, via an indexed selector 2130, to an autonomous, resilient estimator 2180 that uses an online continuous learning technique in accordance with any of the embodiments described herein. When there is an abnormality, the sensors that are determined by conformance matrix logic 2160 as an independent anomaly (i.e., and not an artifact of the propagation of other anomalies through the system 2100) are removed 2170 and the uncomplimented subset of sensors are passed to the autonomous, resilient estimator 2180. For example, the system 2100 may have N sensors, of which p sensors are normal and q sensors are independently abnormal. Note that both p and q are time-varying but p[k]+q[k]=N at each time instant k. The p normal sensors are specified by the conformance matrix logic 2160 and down-selected via the indexed selector 2130 to be inputted to the autonomous, resilient estimator 2180. Note that the normal subset may be continuously changing and, as a result, the internal learning configuration of the autonomous, resilient estimator 2180 is also changing. The online continuous learning is used to learn a (potentially) nonlinear, time-varying, and variable-structure function $f$ that relates the next-step values of the sensors estimates to the current and lagged values of the sensor estimates (i.e., outputs of the autonomous, resilient estimator) and the current and lagged values of the normal sensor measurement (i.e., inputs of the autonomous, resilient estimator) as follows:

$$\hat{S}=[\hat{S}_1 \hat{S}_2 \ldots \hat{S}_N]^T$$

$$\hat{S}^n=[\hat{S}_1^n \hat{S}_2^n \ldots \hat{S}_p^n]^T, \hat{S}^a=[\hat{S}_1^a \hat{S}_2^a \ldots \hat{S}_q^a]^T$$

$$\hat{S}[K+1]=f(\hat{S}[k],\ldots,\hat{S}[k-l],\hat{S}^n[k],\ldots,\hat{S}^n[k-m],k)$$

where l and m are the number of lags used for outputs and inputs, respectively; and the normal and abnormal sensors are depicted with superscripts, n and a, respectively. Note that both l and m might also be found automatically online and they might be time varying as well, hence making $f$ a variable structure. For substantially large-scale systems, a sparsity structure might be exploited in the autonomous, resilient estimator 2180 to have a reduced-order observer, or to have a full order observer in which continuous learning computations may applied at each configuration change event until convergence is achieved. Estimator parameters may then remain constant until the next configuration change occurs.

Figure 23:
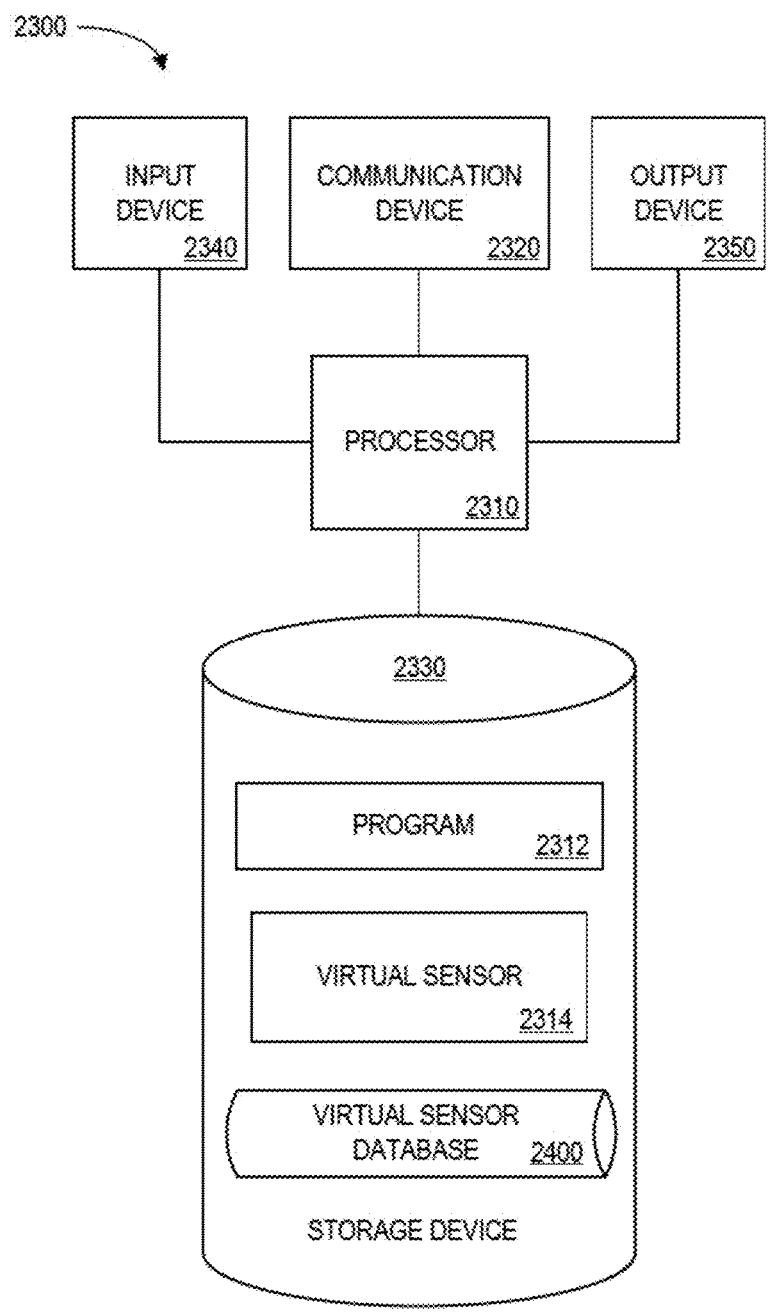
FIG. 23 is a block diagram of an industrial asset protection platform according to some embodiments of the present invention.

The embodiments described herein may be implemented using any number of different hardware configurations. For example, FIG. 23 is a block diagram of an industrial asset protection platform 2300 that may be, for example, associated with the systems 100, 300, 800, 1000 of FIGS. 1, 3, and 10A respectively. The industrial asset protection platform 2300 comprises a processor 2310, such as one or more commercially available Central Processing Units ("CPUs") in the form of one-chip microprocessors, coupled to a communication device 2320 configured to communicate via a communication network (not shown in FIG. 23). The communication device 2320 may be used to communicate, for example, with one or more remote monitoring nodes, user platforms, digital twins, etc. The industrial asset protection platform 2300 further includes an input device 2340 (e.g., a computer mouse and/or keyboard to input virtual sensor and/or predictive modeling information) and/an output device 2350 (e.g., a computer monitor to render a display, provide alerts, transmit recommendations, and/or create reports). According to some embodiments, a mobile device, monitoring physical system, and/or PC may be used to exchange information with the industrial asset protection platform 2300.

The processor 2310 also communicates with a storage device 2330. The storage device 2330 may comprise any appropriate information storage device, including combinations of magnetic storage devices (e.g., a hard disk drive), optical storage devices, mobile telephones, and/or semiconductor memory devices. The storage device 2330 stores a program 2312 and/or a virtual sensor model 2314 for controlling the processor 2310. The processor 2310 performs instructions of the programs 2312, 2314, and thereby operates in accordance with any of the embodiments described herein. For example, the processor 2310 may determine that at least one abnormal monitoring node is currently being attacked or experiencing a fault. The processor 2310 may also continuously execute an adaptive learning process to create or update virtual sensor models for the monitoring nodes. Responsive to an indication that a monitoring node is currently being attacked or experiencing a fault, the processor 2310 may be dynamically reconfigured to estimate a series of virtual node values. for the abnormal monitoring node or nodes based on information from normal monitoring nodes and appropriate virtual sensor models. The series of monitoring node values from the abnormal monitoring node or nodes may then be replaced with the virtual node values The programs 2312, 2314 may be stored in a compressed, uncompiled and/or encrypted format. The programs 2312, 2314 may furthermore include other program elements, such as an operating system, clipboard application, a database management system, and/or device drivers used by the processor 2310 to interface with peripheral devices.

As used herein, information may be "received" by or "transmitted" to, for example: (i) the industrial asset protection platform 2300 from another device; or (ii) a software application or module within the industrial asset protection platform 2300 from another software application, module, or any other source.

In some embodiments (such as the one shown in FIG. 23), the storage device 2330 further stores a virtual sensor database 2400. An example of a database that may be used in connection with the industrial asset protection platform 2300 will now be described in detail with respect to FIG. 24. Note that the database described herein is only one example, and additional and/or different information may be stored therein. Moreover, various databases might be split or combined in accordance with any of the embodiments described herein.

Referring to FIG. 24, a table is shown that represents the virtual sensor database 2400 that may be stored at the industrial asset protection platform 2300 according to some embodiments. The table may include, for example, entries identifying industrial assets to be protected. The table may also define fields 2402, 2404, 2406, 2408, 2410, 2412, 2414 for each of the entries. The fields 2402, 2404, 2406, 2408, 2410, 2412, 2414 may, according to some embodiments, specify: an industrial asset identifier 2402, an industrial asset description 2404, a virtual sensor identifier 2406, a matrix 2408, description 2410, a status 2412, and a neutralization level 2414. The virtual sensor database 2400 may be created and updated, for example, when a new physical system is monitored or modeled, an attack is detected, etc.

The industrial asset identifier 2402 and description 2404 may define a particular machine or system that will be protected. The virtual sensor identifier 2406 might be a unique alphanumeric code identifying a particular sensor being modeled for the industrial asset. The matrix 2408 might be associated with a correlation heat map or lookup table, the description 2410 might indicate what sensor is being estimated, and the status 2412 might indicate, for example, whether the associated monitoring node is operating normally or is currently undergoing a cyber-attack, experience a fault, and/or is being replaced (e.g., with a "predicted" value"). The neutralization level 2414 may be based, for example, on confidence levels and/or the importance of a sensor being attacked (or experiencing a fault).

Figure 25:
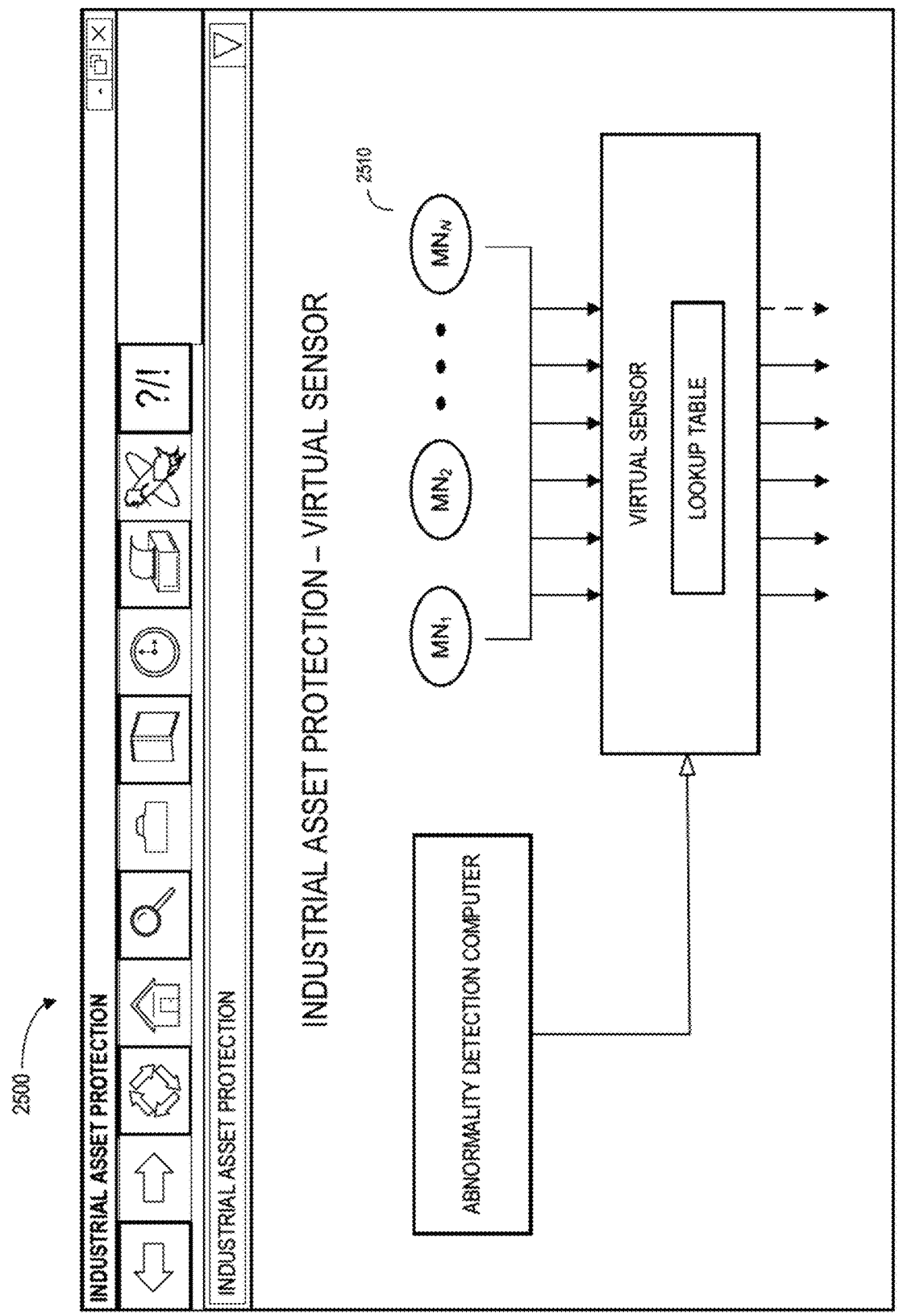
FIG. 25 is a virtual sensor display according to some embodiments.

FIG. 25 is an example of a virtual sensor display 2500 that might be used, for example, to provide information 2510 to an operator and/or to provide an interactive interface allowing an operator to adjust virtual sensors as appropriate. Selection of an element on the display 2500 (e.g., via a touchscreen) might, for example, result in the presentation of more information about that element (e.g., via a popup window), allow an operator to adjust parameters associated with the element, etc.

Figure 26:
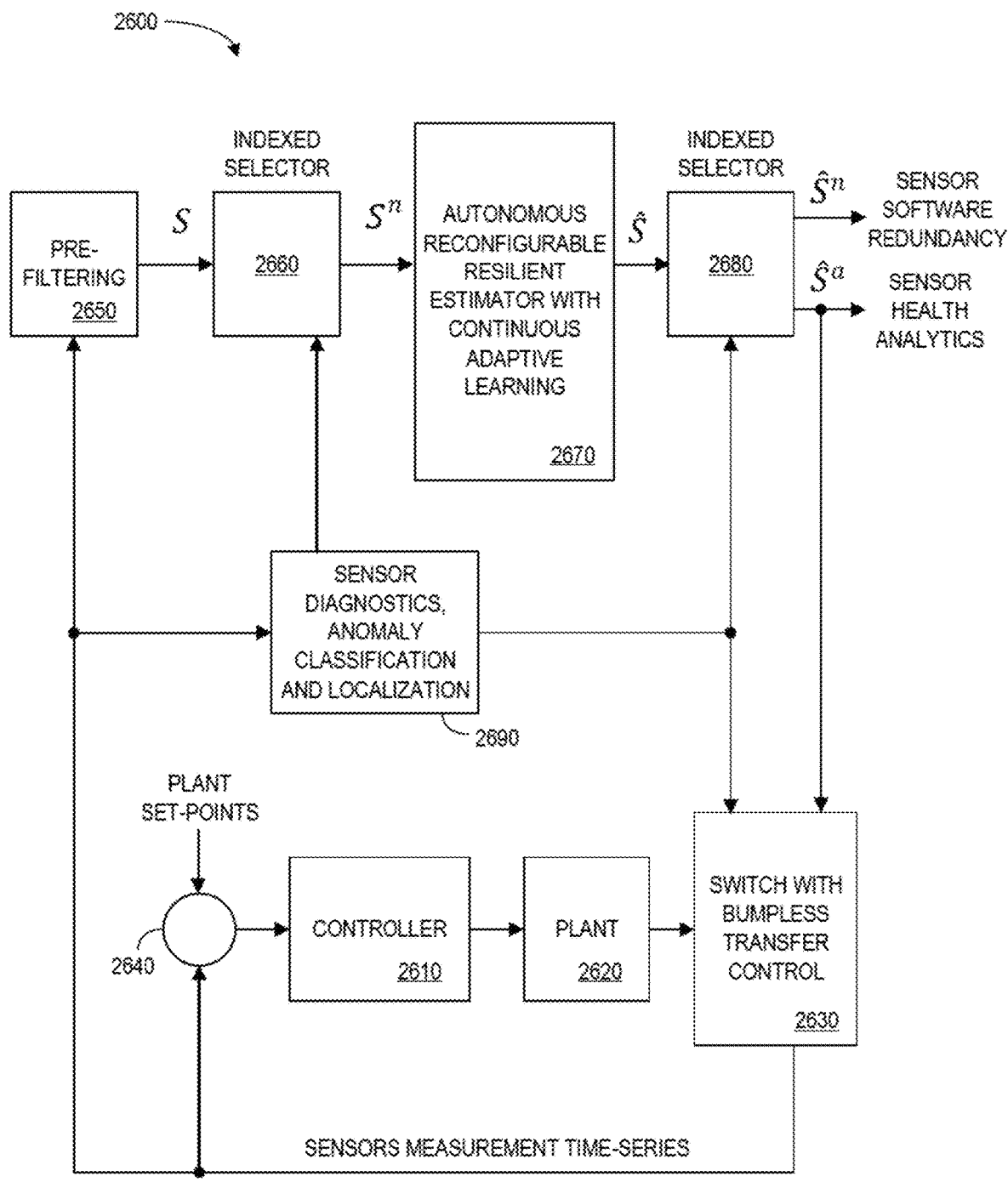
FIG. 26 is an autonomous reconfigurable virtual sensing system in accordance with some embodiments.

FIG. 26 shows a system 2600 that uses an autonomous, resilient estimator 2670 in a controls and analytics platform. In particular, sensor measurement time-series values are combined 2640 with plant set-points and the result goes to a switch with bumpless transfer control 2630 via a controller 2610 and a plant 2620. The sensors measurements time-series values also under go pre-filtering 2650 before being passed to the autonomous, resilient estimator via a first indexed selector 2660. A second indexed selector 2680, controlled by sensor diagnostics and anomaly classification 2690 receives data from the autonomous, resilient estimator 2670 and provides information for sensor software redundancy, sensor health analysis, and control of the switch 2630.

The healthy estimates of the abnormal sensors and their indices are the provided into the control loop and are used to replace of the original abnormal measurements. This is done through the switch with bumpless transfer control 2630 that might utilize any bumpless switching mechanism (such as a bumpless Proportional-Integral-Derivative ("PID"), a switched adaptive controller, a smooth transition controller, etc.). During normal operation, the switch 2630 is open and thus the plant sensor measurements are passed through the feedback loop.

When an anomaly is detected, the switch 2630 is closed and the virtual healthy estimated of the abnormal sensors are passed to the control feedback loop. The bumpless transfer control may help ensure smoothness of the signals during a transition and avoids abrupt (and potentially destabilizing) spikes in the control loop. The sensor measurement time-series may be a combination of the virtual sensor estimates (replacing the independently compromised sensors) and the original plant sensors that are not independently compromised. This mechanism may help neutralize the effect of the abnormal measurements (which could be due the abnormality of the sensor itself, such as a sensor fault, or a cyber-attack on the sensor) and maintains healthy operations of the plant. Note that the switch 2630 can be re-opened as soon as the plant status is back to normal (again with bumpless transfer control) or may remain latched in for some additional period time and opened after that delay. According to some embodiments, the estimates of the abnormal measurement are also used for further health analytics. The system 2600 may also produce estimates of healthy measurements in real-time. These estimates may remain in "stand-by" and when any of those sensors becomes abnormal the 2600 system can adopt a new configuration. According to some embodiments, these estimates also provide software redundancy to increase the reliability of plant operations.

Some embodiments described herein may provide systems and/or methods for autonomous reconfigurable virtual sensing to neutralize the effect of anomalies (e.g., cyber-attack or faults) in system measurements. Embodiments may provide correct estimates of compromised sensor measurements using uncompromised sensor measurements, thus replacing the comprised sensors with healthy virtual (or "soft") sensors. According to some embodiments, an autonomous, resilient estimator may use continuous adaptive learning. The virtual sensor estimations may be computed online using an adaptive recursive method, such as one based on RL. Embodiments may be scalable and efficient and automatically adjust a configuration to accommodate a time-varying uncompromised portion of system sensors. Moreover, embodiments may work with partial or no a priori knowledge (e.g., a model).

Some embodiments may use conformal prediction to automatically determine whether neutralization is feasible for a current system operational region and/or when a healthy sensor or a safe shut down is appropriate. Also, once the neutralization is complete, some embodiments utilize a human-in-the-loop decision mechanism to determine if/when the physical sensors can be brought back into the control loop (e.g., as described in connection with FIG. 28).

Figure 27:
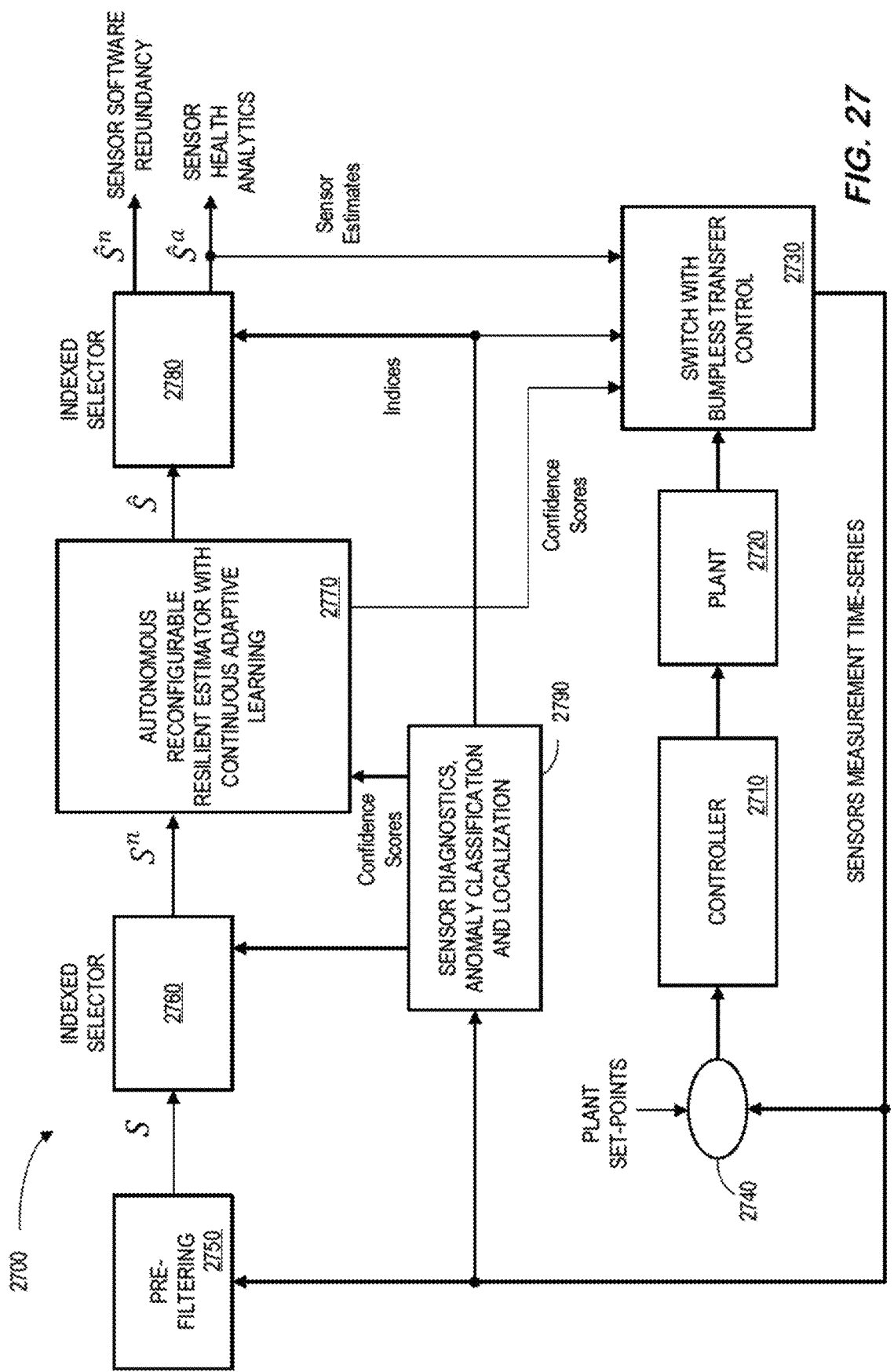
FIG. 27 is an adaptive, self-tuning neutralization system according to some embodiments.

FIG. 27 is an adaptive, self-tuning neutralization system 2700 according to some embodiments. As before, the system 2700 uses an autonomous, resilient estimator 2770 in a controls and analytics platform. Sensor measurement time-series values are combined 2740 with plant set-points and the result goes to a switch with bumpless transfer control 2730 via a controller 2710 and a plant 2720. The sensors measurements time-series values are also pre-filtered 2750 before being passed to the autonomous, reconfigurable resilient estimator 2770 via a first indexed selector 2760. A second indexed selector 2780, controlled by sensor diagnostics and anomaly classification 2790 receives data from the autonomous, resilient estimator 2770 and provides information for sensor software redundancy, sensor health analysis, and control of the switch 2730. According to some embodiments, confidence scores may be provided from the sensor diagnostics, anomaly classification aid localization 2790 to the autonomous, reconfigurable resilient estimator 2770 and/or from the autonomous, reconfigurable resilient estimator 2770 to the switch 2730.

Together, the controller 2710, plant 2720, and switch 2730 may et as a "control loop" for the system 2700. The healthy estimates of the abnormal sensors and their indices are the provided into the control loop and are used to replace of the original abnormal measurements. This is done through the switch with bumpless transfer control 2730 that might utilize any bumpless switching mechanism (such as a bumpless PID), a switched adaptive controller, a smooth transition controller, etc.). During normal operations, the switch 2730 is open and thus the plant sensor measurements are passed through the feedback loop. When an anomaly is detected, the switch 2730 is closed and the virtual healthy estimates of the abnormal sensors are passed to the control feedback loop. The bumpless transfer control may help ensure smoothness of the signals transition an avoid abrupt (and potentially destabilizing) spikes in the control loop. The sensor measurement time-series may comprise, for example a combination of the virtual sensor estimates (replacing the independently compromised sensors) and the original plant sensors, which are not independently compromised. This may help neutralize the effect of the abnormal measurements (which could be due the abnormality of the sensor itself, that is a fault or a cyber-attack on the sensor) and help maintain healthy operation of the asset. The switch 2730 may be opened as soon as the asset status returns to normal (again with bumpless transfer control) or may remain latched for some additional time (and be opened with after the time delay). The estimates of the abnormal measurement may also be used for further health analytics. According to some embodiments, the system 2700 may produce estimates of the healthy measurements in substantially real-time. These estimates may remain in stand-by mode until any of those sensors becomes abnormal (and, as a result, the system 2700 adopts a new configuration). These estimates may also serve as a software redundancy to increase reliability of asset operations.

Some embodiments may not only detect and localize cyber-attacks on a protected asset but also allow for the continuing operation of the asset during cyber-attacks or faults via "neutralization" (e.g., providing active tunable resilience). The system neutralization might proceed at different neutralization modes and performance levels of asset protection based on, for example: an identified criticality of an encountered cyber-attack, an identified criticality of a protected asset, a current operating mode of a protected asset, etc. According to some embodiments, the system 2700 may analyze the attack and the status of the asset in substantially real-time and decide on an appropriate neutralization performance level. Note that neutralization performance may be highly dependent on the observability characteristics of the node suite (i.e., protected sensors and actuator set) of the protected asset that may be a result of; for example: redundancy, physical location, and/or type of sensors/actuators. The observability of an attacked subset of nodes may be determined in substantially real-time during an attack by the neutralization module that may determine the neutralization mode. For example, if the attacked subset of nodes is highly observable from the non-attacked nodes, neutralization might use resilient virtual estimation of the attacked nodes and the goal of neutralization might be continual operation of the asset with minimal performance degradation. However, if the real-time observability analysis determines that the attacked subset is not observable from the remaining non-attacked nodes, neutralization might aim for operation with a degraded (but secure) performance. In some cases, the appropriate level of neutralization might even be associated with a safe shutdown of the asset. The real-time observability analysis may also enable estimation error statistics of the virtually sensed nodes. These statistics might be used, for example, to determine and/or display the confidence boundaries of the neutralization that is being performed. These confidence boundaries might, for example, be observed by plant operators and allow them to take appropriate protective actions based on the following:

a Failure Mode and Effect Analysis ("FMEA"), and/or
a Threat Mode and Effect Analysis ("TMEA").

According to some embodiments, neutralization performance levels and confidence boundaries may also depend on confidence levels of the detection and localization of one or more cyber-attacks. For example, if an attack is localized with a limited confidence then the confidence boundaries of neutralization may be relatively large as compared to an attack that was localized with a higher level of confidence.

According to some embodiments, the autonomous, reconfigurable resilient estimator 2770 for sensor attack neutralization is based at least in part on a conformal prediction. The conformal prediction may, for example, use past experience to determine a level of confidence in a current decision/estimation (e.g., the "confidence scores" in FIG. 27). The autonomous, reconfigurable resilient estimator 2770 may be automatically reconfigured based on the available healthy sensors (which may include a subset that are hardened and hence are always trustable) and estimated values for the rest of the sensors. The system 2700 may also calculate a confidence level for each sensor estimate (e.g., by using POMDP and/or Q-learning). This information may be passed into switching control logic that decides whether to switch to the virtual sensor for each individual sensor. It may also decide overall, based on the current system situation, whether or neutralization is feasible. Note that this switching control logic may have its own training (which might also include a predefined set of rules based on system regions of asset operation, set-points, etc.).

Figure 28:
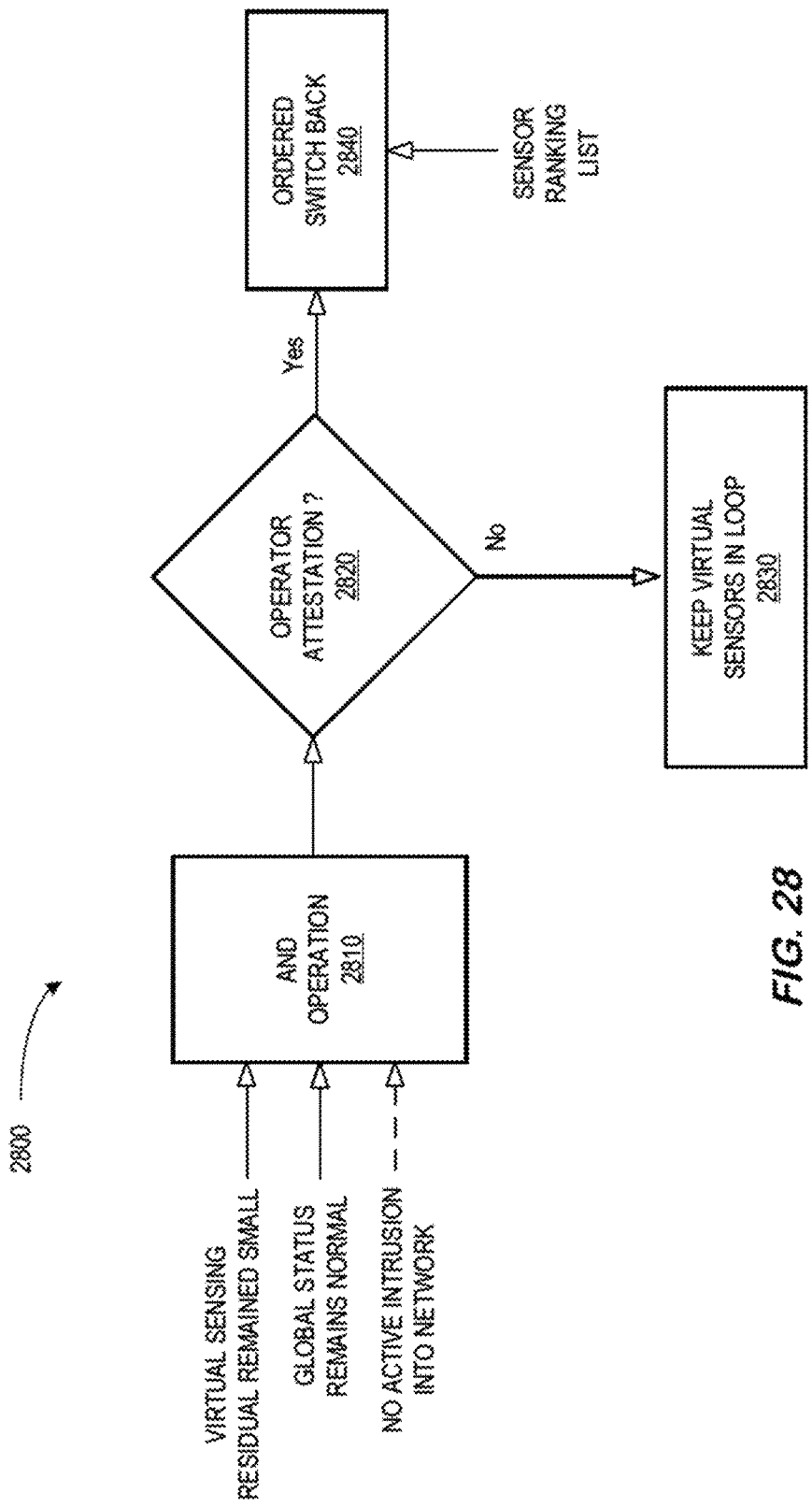
FIG. 28 is logic for switching from virtual sensors back to physical sensors in accordance with some embodiments.

According to some embodiments, the system 2700 might determine that a sensor is no longer being attacked (or is no longer experiencing a fault) and, as a result, it might be appropriate to replace virtual estimated values with the actual monitoring node values generated sensor. FIG. 28 is logic 2800 for switching back from virtual sensors to physical sensors in accordance with some embodiments. In particular, the logic 2800. illustrates some factors that may be (e.g., after neutralization is accomplished) considered when deciding whether or not switch back the controller to physical sensors (and switch off virtual sensors). An and operation 2810 may receive an indication of whether a virtual sensing residual remained small, an indication of whether a global status has remained normal, and/or an external indication no active intrusion into the network is being experience. Based on all of these factors, a human operator may be asked to attest 2820 that the virtual sensor information should be replace with actual, physical data. If the operator does not do so, then the virtual sensors may be kept in the loop 2830. If the operator does provide the attestation 2820, then the system may switch back to actual, physical data 2840.

According to some embodiments, the switch back 2840 may be "ordered" such that is performed in accordance with a sensor ranking list. That is, the sensors may be switched back one at a time according the sensor ranking list, starting with the lowest ranked (least critical) sensor. There might be, in some embodiments, a minimum waiting time after each sensor is switched back before the next sensor is considered. The waiting time might be determined using simulations and/or may be selected based on an amount of time it takes to neutralize the system using the virtual sensor in the loop (e.g., once the corresponding physical sensor is attacked and all other physical sensors are healthy).

If the global status becomes abnormal, the switch back 2850 process may be halted, and all the virtual sensors might be switched into the loop. After all physical sensor are switched back, if global status becomes abnormal within a certain time window (e.g., based on a maximum neutralization time of all virtual sensors in simulations) then all of the virtual sensors may again be switched in the control loop. In this case, the virtual sensors may be switched off only by a manual override from an operator with sufficient administrator authority.

The network intrusion detection could be based on network monitoring using supervised or unsupervised anomaly detection methods, signature method detection or be based on network intrusion detection, such as Quantum Key Distribution ("QKD"). As used herein, the term "QKD" may refer to a communication method that implements a cryptographic protocol utilizing components of quantum mechanics. Such network intrusion detection methods may help protect network integrity. Being an active defense solution, some embodiments may automatically neutralize attacked sensors by replacing compromised sensors with virtual sensor estimates. Once the system is completely neutralized and disinfected, embodiments may switch the system back to use the original physical sensors through a logical mechanism, in which one of the checks is to make sure the network is uncompromised. Furthermore, since QKD can provide reliable eavesdropping detection capabilities, it may also provide a valuable indication for detecting replay attacks without interfering with physical system performance.

Thus, a virtual sensing system may get a portion of the sensor measurements that are healthy and uncompromised and then use that information to provide healthy estimations for the measurements of sensors that are compromised. Moreover, embodiments may improve cyber security and accommodate critical functionality associated with an industrial asset. Some embodiments may by-pass signals from attacked sensors using estimated signals created using data from healthy sensors. This approach may allow for a correction mechanism to sustain the operations while alerting operators about a cyber-attack or fault. In some embodiments, an adaptive, reconfigurable resilient estimation for sensor attack neutralization may get a portion of the sensor measurements that are healthy and uncompromised and use that information to provide healthy estimations for the measurements of the sensors that are compromised.

Since the compromised/uncompromised portions of measurements can be any subset of the system sensors, this is essentially a combinatorial problem that requires that a substantial number of estimation models be developed and stored (and hence development times may be substantial). Such a brute force approach may build a model as a look-up table of parameters for each sensor using least squares regression (or other parameter estimation techniques) offline and save all of the models in the system. In addition to a large development effort, this approach may require vast amount of memory and computational power. By providing a self-tuning resilience level, embodiments may automatically decide when to neutralize the sensor attacks (as opposed to requiring a safe shut down).

Some technical advantages of the embodiments described herein include: replacing faulty/attacked sensors with corrected estimates to provide a resilient estimation for attack neutralization, eliminating some sensors to reduce cost (e.g., in a gas turbine one could replace low and high shaft speed sensor, respectively, with virtual sensing); providing a surrogate back-up for critical and/or unreliable sensors; improving control performance by increasing the number of sensors that are available (including sensor that are difficult or expensive to directly measure), etc. Other advantages may include reduced asset down-time resulting from to cyber-attack incents and faults, increased asset reliability (resulting from software and algorithmic redundancy), reduced sensor cost, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, autonomous vehicles, military devices, etc.

According to some embodiments, a virtual sensor model may be created (e.g., via an adaptive learning process) to replace a corresponding sensor monitoring node when needed. According to other embodiments, similar approaches may be taken with respect to other types of monitoring nodes. For example, a virtual model might replace an actuator monitoring node or a controller monitoring node that is currently experiencing an abnormality.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of monitoring nodes, each monitoring node generating a series of monitoring node values over time that represent a current operation of the industrial asset;
an abnormality detection computer to determine that at least one abnormal monitoring node is currently being attacked or experiencing a fault; and
an autonomous, resilient estimator, coupled to the plurality of monitoring nodes and the abnormality detection computer and having an estimation error standard deviation substantially comparable to each monitoring node, to:
  (i) continuously execute an adaptive learning process to create or update virtual sensor models for the monitoring nodes,
  (ii) responsive to an indication that the at least one abnormal monitoring node is currently being attacked or experiencing a fault, automatically determine a level of neutralization,
  (iii) dynamically reconfigure the autonomous, resilient estimator to estimate a series of virtual node values for the abnormal monitoring node or nodes based on information from normal monitoring nodes, appropriate virtual sensor models, and the determined level of neutralization, and
  (iv) replace the series of monitoring node values from the abnormal monitoring node or nodes with the series of virtual node values.

2. The system of claim 1, wherein the determined level of neutralization is based on: (i) an identified criticality of an encountered cyber-attack, (ii) an identified criticality of the industrial asset, and (iii) a current operating mode of the industrial asset.

3. The system of claim 1, wherein the determined level of neutralization is associated with at least one of: (i) minimal performance degradation, (ii) degraded but secure performance, and (iii) a safe shutdown procedure.

4. The system of claim 1, wherein the determined level of neutralization is associated with estimation error statistics of a virtually sensed node.

5. The system of claim 4, wherein the estimation error statistics are associated with confidence boundaries for at least one of: (i) failure mode and effect analysis, and (ii) threat mode and effect analysis.

6. The system of claim 1, wherein the adaptive learning process is associated with a reinforcement learning method.

7. The system of claim 6, wherein the reinforcement learning method is associated with at least one of: (i) Q-learning, (ii) a recursive least-squares method, and (iii) a recursive weighted least-squares method.

8. The system of claim 1, wherein the autonomous, resilient estimator is associated with a partially observed Markov decision process with continuous state and action spaces.

9. The system of claim 1, wherein the virtual sensor models are created or updated based on at least one of: (i) an analysis of variance, and (ii) a correlation/regression analysis.

10. The system of claim 1, wherein the dynamic reconfiguration is associated with at least one of: (i) an indexed selector, (ii) bumpless transfer control, and (iii) a proportional-integral-derivative controller, (iv) a switched adaptive control, and (v) a smooth transition controller.

11. The system of claim 1, wherein the autonomous, resilient estimator estimates the series of virtual node values directly in time space after pre-filtering.

12. The system of claim 11, wherein the pre-filtering includes: (i) de-noising via low pass filtering using low pass filters with individual cut-off frequencies tuned based on individual bandwidths of each monitoring node, and (ii) outlier removal by computing a standard deviation of measurement over a sliding window.

13. The system of claim 1, wherein the autonomous, resilient estimator further: (i) is unbiased with a zero-mean error, (ii) has white Gaussian noise associated with a Cramer-Rao information bound, and (iii) is statistically efficient with an error asymptotically converging to zero.

14. The system of claim 1, wherein the industrial asset is associated with at least one of: (i) a turbine, (ii) a gas turbine, (iii) a wind turbine, (iv) an engine, (v) a jet engine, (vi) a locomotive engine, (vii) a refinery, (viii) a power grid, (ix) a dam, and (x) an autonomous vehicle.

15. A computerized method to protect an industrial asset associated with a plurality of monitoring nodes, each monitoring node generating a series of monitoring node values over time that represent current operation of the industrial asset, comprising:
- determining, by an abnormality detection computer, that at least one abnormal monitoring node is currently being attacked or experiencing a fault;
- continuously executing, by an autonomous, resilient estimator, an adaptive learning process to create or update virtual sensor models for the monitoring nodes;
- responsive to an indication that the at least one abnormal monitoring node is currently being attacked or experiencing a fault, automatically determining a level of neutralization, wherein the determined level of neutralization is based on a confidence boundary associated with a virtually sensed node; and
- dynamically reconfiguring the autonomous, resilient estimator to estimate a series of virtual node values for the abnormal monitoring node or nodes based on information from normal monitoring nodes, appropriate virtual sensor models, and the determined level of neutralization; and
- replacing the series of monitoring node values from the abnormal monitoring node or nodes with the series of virtual node values.

16. The method of claim 15, wherein the determined level of neutralization is based at least in part on at least one of: (i) an identified criticality of an encountered cyber-attack, (ii) an identified criticality of the industrial asset, and (iii) a current operating mode of the industrial asset.

17. The method of claim 15, wherein the determined level of neutralization is associated with at least one of: (i) minimal performance degradation, (ii) degraded but secure performance, and (iii) a safe shutdown procedure.

18. The method of claim 15, wherein the determined level of neutralization is associated with estimation error statistics of a virtually sensed node.

19. The method of claim 18, wherein the estimation error statistics are associated with confidence boundaries for at least one of: (i) failure mode and effect analysis, and (ii) threat mode and effect analysis.

20. The method of claim 15, wherein the adaptive learning process is associated with a reinforcement learning method.

21. A non-transitory, computer-readable medium storing instructions that, when executed by a computer processor, cause the computer processor to perform a method to protect an industrial asset associated with a plurality of monitoring nodes, each monitoring node generating a series of monitoring node values over time that represent current operation of the industrial asset, the method comprising: determining, by an abnormality detection computer, that at least one abnormal monitoring node is currently being attacked or experiencing a fault; continuously executing, by an autonomous, resilient estimator, an adaptive learning process to create or update virtual sensor models for the monitoring nodes; responsive to an indication that the at least one abnormal monitoring node is currently being attacked or experiencing a fault, dynamically reconfiguring the autonomous, resilient estimator to estimate a series of virtual node values for the abnormal monitoring node or nodes based on information from normal monitoring nodes and appropriate virtual sensor models; replacing the series of monitoring node values from the abnormal monitoring node or nodes with the series of virtual node values; and responsive to an indication that the at least one abnormal monitoring node is no longer currently being attacked or experiencing a fault, replacing the series of virtual node values with the series of monitoring node values from the abnormal monitoring node is no longer currently being attacked or experiencing a fault.

* * * * *